(12) United States Patent
Suzuki et al.

(10) Patent No.: US 10,798,697 B2
(45) Date of Patent: Oct. 6, 2020

(54) TERMINAL APPARATUS THAT TRANSMIT PUSCH, BASE STATION APPARATUS THAT RECEIVES PUSCH, AND COMMUNICATION METHOD THAT USES PUSCH

(71) Applicants: Sharp Kabushiki Kaisha, Sakai, Osaka (JP); FG Innovation Company Limited, Tuen Mun, New Territories (HK)

(72) Inventors: Shoichi Suzuki, Sakai (JP); Tomoki Yoshimura, Sakai (JP); Wataru Ouchi, Sakai (JP); Liqing Liu, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 16/332,838

(22) PCT Filed: Aug. 15, 2017

(86) PCT No.: PCT/JP2017/029353
§ 371 (c)(1),
(2) Date: Mar. 13, 2019

(87) PCT Pub. No.: WO2018/051707
PCT Pub. Date: Mar. 22, 2018

(65) Prior Publication Data
US 2019/0373585 A1    Dec. 5, 2019

(30) Foreign Application Priority Data

Sep. 14, 2016 (JP) .................................. 2016-179256

(51) Int. Cl.
*H04W 72/04* (2009.01)
*H04W 76/27* (2018.01)
(Continued)

(52) U.S. Cl.
CPC ......... *H04W 72/042* (2013.01); *H04L 1/0003* (2013.01); *H04L 5/0082* (2013.01);
(Continued)

(58) Field of Classification Search
CPC .................................................... H04W 72/042
See application file for complete search history.

(56) References Cited

U.S. PATENT DOCUMENTS

| | | | |
|---|---|---|---|
| 2013/0250924 A1* | 9/2013 | Chen ..................... | H04L 1/1819 370/336 |
| 2013/0329701 A1* | 12/2013 | Bajzec .................. | H04L 1/1887 370/336 |
| 2015/0117287 A1* | 4/2015 | Kim ....................... | H04W 4/18 370/311 |

OTHER PUBLICATIONS

"3rd Generation Partnership Project; Technical Specification Group Radio Access Network; Evolved Universal Terrestrial Radio Access (E-UTRA); Physical layer procedures (Release 12)", 3GPP TS 36.213 V12.5.0, Mar. 2015, pp. 1-239.
(Continued)

*Primary Examiner* — Edan Orgad
*Assistant Examiner* — Won Tae C Kim
(74) *Attorney, Agent, or Firm* — Keating & Bennett, LLP

(57) ABSTRACT

A terminal apparatus receives a PDCCH including downlink control information; transmits a PUSCH including a transport block, based on detection of the PDCCH; and triggers non-adaptive retransmission without waiting for a feedback for preceding transmission in a bundle, when a parameter of an RRC layer is configured to be TRUE. A size of the transport block is given at least based on whether the parameter of the RRC layer is configured to be TRUE.

8 Claims, 20 Drawing Sheets

(51) Int. Cl.
*H04L 1/00* (2006.01)
*H04L 5/00* (2006.01)
*H04W 72/14* (2009.01)

(52) U.S. Cl.
CPC ....... *H04W 72/0446* (2013.01); *H04W 72/14* (2013.01); *H04W 76/27* (2018.02)

(56) References Cited

OTHER PUBLICATIONS

"3rd Generation Partnership Project; Technical Specification Group Radio Access Network; Evolved Universal Terrestrial Radio Access (E-UTRA); Physical channels and modulation (Release 12)", 3GPP TS 36.211 V12.5.0, Mar. 2015, pp. 1-136.
CMCC, "Motivation for New Work Item Proposal: UL transmission Enhancement for LTE", 3GPP TSG RAN Meeting #71, RP-160226, Mar. 7-10, 2016, 8 pages.

* cited by examiner

| UPLINK CYCLIC PREFIX CONFIGURATION (*UL-CyclicPrefixLength*) | CYCLIC PREFIX LENGTH $N_{CP,l}$ | SC-FDMA SYMBOL LENGTH |
|---|---|---|
| NORMAL CYCLIC PREFIX | 160 for $l = 0$<br>144 for $l = 1, 2, \cdots, 6$ | $(160+2048) \cdot T_s$ for $l = 0$<br>$(144+2048) \cdot T_s$ for $l = 1, 2, \cdots, 6$ |

FIG. 6

| UL/DL CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

FIG. 7

| SPECIAL SUBFRAME CONFIGURATION | DwPTS | UpPTS |
|---|---|---|
| 0 | $6592 \cdot T_s$ (3 symbol) | $(1+X) \cdot 2192 \cdot T_s$ (1+X symbol) |
| 1 | $19760 \cdot T_s$ (9 symbol) | |
| 2 | $21952 \cdot T_s$ (10 symbol) | |
| 3 | $24144 \cdot T_s$ (11 symbol) | |
| 4 | $26336 \cdot T_s$ (12 symbol) | |
| 5 | $6592 \cdot T_s$ (3 symbol) | $(2+X) \cdot 2192 \cdot T_s$ (2+X symbol) |
| 6 | $19760 \cdot T_s$ (9 symbol) | |
| 7 | $21952 \cdot T_s$ (10 symbol) | |
| 8 | $24144 \cdot T_s$ (11 symbol) | |
| 9 | $13168 \cdot T_s$ (6 symbol) | |
| 10 | $13168 \cdot T_s$ (6 symbol) | $13152 \cdot T_s$ (6 symbol) |

FIG. 10

The bundle 11A (four consecutive uplink/special subframes)

The bundle 11B (four consecutive uplink/special subframes)

The bundle 11C (four consecutive uplink/special subframes)

Initial transmission
(First PUSCH transmission in the bundle)

Non-adaptive retransmission
(Second, Third and Fourth transmission in the bundle)

| UL/DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | | 4 | | | | | 4 |
| 3 | | 4 | | | | | | | 4 | 4 |
| 4 | | | | | | | | | 4 | 4 |
| 5 | | | | | | | | | 4 | |
| 6 | | 7 | 7 | | | | 7 | 7 | | 5 |

| UL/DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 2 | | | | 4 | | | | | 4 | |
| | D | S | U | D | D | D | S | U | D | D |

PDCCH → PUSCH 1101

| UL/DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | 6 | | 4 | 6 | 6 | | | 4 |
| 2 | | | 5 | | 4 | | | 5 | | 4 |
| 3 | 4 | | | | | | | 4 | 4 | 4 |
| 4 | | | | | | | | 4 | 4 | 4 |
| 5 | | | | | | | | 4 | 4 | |
| 6 | 7 | 7 | | | | 7 | 7 | | | 5 |

| UL/DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 2 | | 5 | | 4 | | | 5 | | 4 | |
| | D | S | U | D | D | D | S | U | D | D |

| MCS Index $I_{MCS}$ | $Q'_m$ | TBS Index $I_{TBS}$ | Redundancy Version $rv_{idx}$ |
|---|---|---|---|
| 0 | 2 (QPSK) | 0 | 0 |
| 1 | 2 (QPSK) | 2 | 0 |
| 2 | 2 (QPSK) | 4 | 0 |
| 3 | 2 (QPSK) | 6 | 0 |
| 4 | 2 (QPSK) | 8 | 0 |
| 5 | 4 (16QAM) | 10 | 0 |
| 6 | 4 (16QAM) | 11 | 0 |
| 7 | 4 (16QAM) | 12 | 0 |
| 8 | 4 (16QAM) | 13 | 0 |
| 9 | 4 (16QAM) | 14 | 0 |
| 10 | 4 (16QAM) | 15 | 0 |
| 11 | 6 (64QAM) | 16 | 0 |
| 12 | 6 (64QAM) | 17 | 0 |
| 13 | 6 (64QAM) | 18 | 0 |
| 14 | 6 (64QAM) | 19 | 0 |
| 15 | 6 (64QAM) | 20 | 0 |
| 16 | 6 (64QAM) | 21 | 0 |
| 17 | 6 (64QAM) | 22 | 0 |
| 18 | 6 (64QAM) | 23 | 0 |
| 19 | 6 (64QAM) | 24 | 0 |
| 20 | 8 (256QAM) | 25 | 0 |
| 21 | 8 (256QAM) | 26 | 0 |
| 22 | 8 (256QAM) | 27 | 0 |
| 23 | 8 (256QAM) | 28 | 0 |
| 24 | 8 (256QAM) | 29 | 0 |
| 25 | 8 (256QAM) | 30 | 0 |
| 26 | 8 (256QAM) | 31 | 0 |
| 27 | 8 (256QAM) | 32 | 0 |
| 28 | 8 (256QAM) | 33 | 0 |
| 29 | reserved | | 1 |
| 30 | | | 2 |
| 31 | | | 3 |

FIG. 17

| TBS Index $I_{TBS}$ | P | | | |
|---|---|---|---|---|
| | 1 | 2 | ... | 100 |
| 0 | 16 | 32 | ... | 2792 |
| 1 | 24 | 56 | ... | 3624 |
| 2 | 32 | 72 | ... | 4584 |
| 3 | 40 | 104 | ... | 5736 |
| ... | ... | ... | ... | ... |
| 32 | 840 | 1672 | ... | 84760 |
| 33 | 968 | 1992 | ... | 97896 |

FIG. 18

$$\text{Set } k_0 = R_{subblock} \cdot \left(2 \cdot \left\lceil \frac{N_{cb}}{8R_{subblock}} \right\rceil \cdot rv_{idx} + 2 \right)$$

Set $k = 0$ and $j = 0$ while $\{ k < E \}$ if $w_{(k_0+j) \bmod N_{cb}} \neq <NULL>$ $e_k = w_{(k_0+j) \bmod N_{cb}}$ $k = k+1$ end if $j = j+1$ end while

FIG. 21

TERMINAL APPARATUS THAT TRANSMIT PUSCH, BASE STATION APPARATUS THAT RECEIVES PUSCH, AND COMMUNICATION METHOD THAT USES PUSCH

TECHNICAL FIELD

The present invention relates to a terminal apparatus, a base station apparatus, a communication method, and an integrated circuit.

This application claims priority based on JP 2016-179256 filed on Sep. 14, 2016, the contents of which are incorporated herein by reference.

BACKGROUND ART

A radio access method and a radio network for cellular mobile communications (hereinafter, referred to as "Long Term Evolution (LTE, Registered Trademark)", or "Evolved Universal Terrestrial Radio Access (EUTRA)") have been studied in the 3rd Generation Partnership Project (3GPP). In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each of the multiple areas being covered by a base station apparatus. A single base station apparatus may manage a plurality of cells.

LTE supports a Time Division Duplex (TDD). LTE that employs the TDD scheme is also referred to as TD-LTE or LTE TDD. In TDD, uplink signals and downlink signals are time division multiplexed. Furthermore, LTE supports a Frequency Division Duplex (FDD).

In the 3GPP, transmission of a PUSCH in UpPTS of a special subframe is under study as a solution for enhancing an uplink capacity (NPL 1).

CITATION LIST

Non Patent Literature

NPL 1: "Motivation for New Work Item Proposal:UL transmission Enhancement for LTE", R1-160226, CMCC, 3GPP TSG RAN Meeting #71, Gothenburg, Sweden, 7-10 Mar. 2016.
NPL 2: "3GPP TS 36.211 V12.5.0 (2015-03)", 26 Mar. 2015.
NPL 3: "3GPP TS 36.213 V12.5.0 (2015-03)", 26 Mar. 2015.

SUMMARY OF INVENTION

Technical Problem

An aspect of the present invention provides a terminal apparatus capable of efficiently communicating with a base station apparatus by using an uplink signal, a base station apparatus communicating with the terminal apparatus, a communication method used for the terminal apparatus, a communication method used for the base station apparatus, an integrated circuit mounted on the terminal apparatus, and an integrated circuit mounted on the base station apparatus. The uplink signal may include a PUSCH, an SRS, and/or a PRACH.

Solution to Problem (1) According to some aspects of the present invention, the following measures are provided. In other words, a first aspect of the present invention provides a terminal apparatus including: a reception unit that receives a PDCCH including downlink control information; and a transmission unit that transmits a PUSCH including a transport block, based on detection of the PDCCH. The transmission unit triggers non-adaptive retransmission without waiting for a feedback for preceding transmission in a bundle, when a parameter TTIbundling of an RRC layer is configured to be TRUE. A size of the transport block is given at least based on whether the parameter TTIbundling of the RRC layer is configured to be TRUE.

(2) A second aspect of the present invention provides a base station apparatus including: a transmission unit that transmits a PDCCH including downlink control information to a terminal apparatus; and a reception unit that receives a PUSCH including a transport block from the terminal apparatus, based on the transmission of the PDCCH. When a parameter TTIbundling of an RRC layer is configured to be TRUE for the terminal apparatus, the terminal apparatus triggers non-adaptive retransmission without waiting for a feedback for preceding transmission in a bundle. A size of the transport block is given at least based on whether the parameter TTIbundling of the RRC layer is configured to be TRUE for the terminal apparatus.

(3) A third aspect of the present invention provides a communication method used for a terminal apparatus, the communication method including the steps of: receiving a PDCCH including downlink control information; transmitting a PUSCH including a transport block, based on detection of the PDCCH; and triggering non-adaptive retransmission without waiting for a feedback for preceding transmission in a bundle, when a parameter TTIbundling of an RRC layer is configured to be TRUE. A size of the transport block is given at least based on whether the parameter TTIbundling of the RRC layer is configured to be TRUE.

(4) A fourth aspect of the present invention provides a communication method used for a base station apparatus, the communication method including the steps of: transmitting a PDCCH including downlink control information to a terminal apparatus; receiving a PUSCH including a transport block from the terminal apparatus, based on the transmission of the PDCCH; and when a parameter TTIbundling of an RRC layer is configured to be TRUE for the terminal apparatus, by the terminal apparatus, triggering non-adaptive retransmission without waiting for a feedback for preceding transmission in a bundle. A size of the transport block is given at least based on whether the parameter TTIbundling of the RRC layer is configured to be TRUE for the terminal apparatus.

Advantageous Effects of Invention

According to an aspect of the present invention, a terminal apparatus and a base station apparatus can efficiently communicate with each other by using an uplink signal.

BRIEF DESCRIPTION OF DRAWINGS

FIG. 6 is a diagram illustrating an example of an uplink cyclic prefix configuration according to the present embodiment.

FIG. 7 is a table illustrating an UL/DL configuration in the present embodiment.

FIG. 10 is a diagram illustrating an example of a special subframe configuration for a normal CP in a downlink according to the present embodiment.

FIG. 17 is diagram illustrating a table in which an MCS index ($I_{MCS}$), ($Q'_m$), a transport block size index ($I_{TBS}$), and a redundant version ($rv_{idx}$) are associated with each other.

FIG. 18 is a diagram illustrating association among P, the transport block size index ($I_{TBS}$), and a transport block size.

FIG. 21 is a diagram illustrating an example of bit selection and removal according to the present embodiment.

DESCRIPTION OF EMBODIMENTS

Embodiments of the present invention will be described below.

Figure 1:
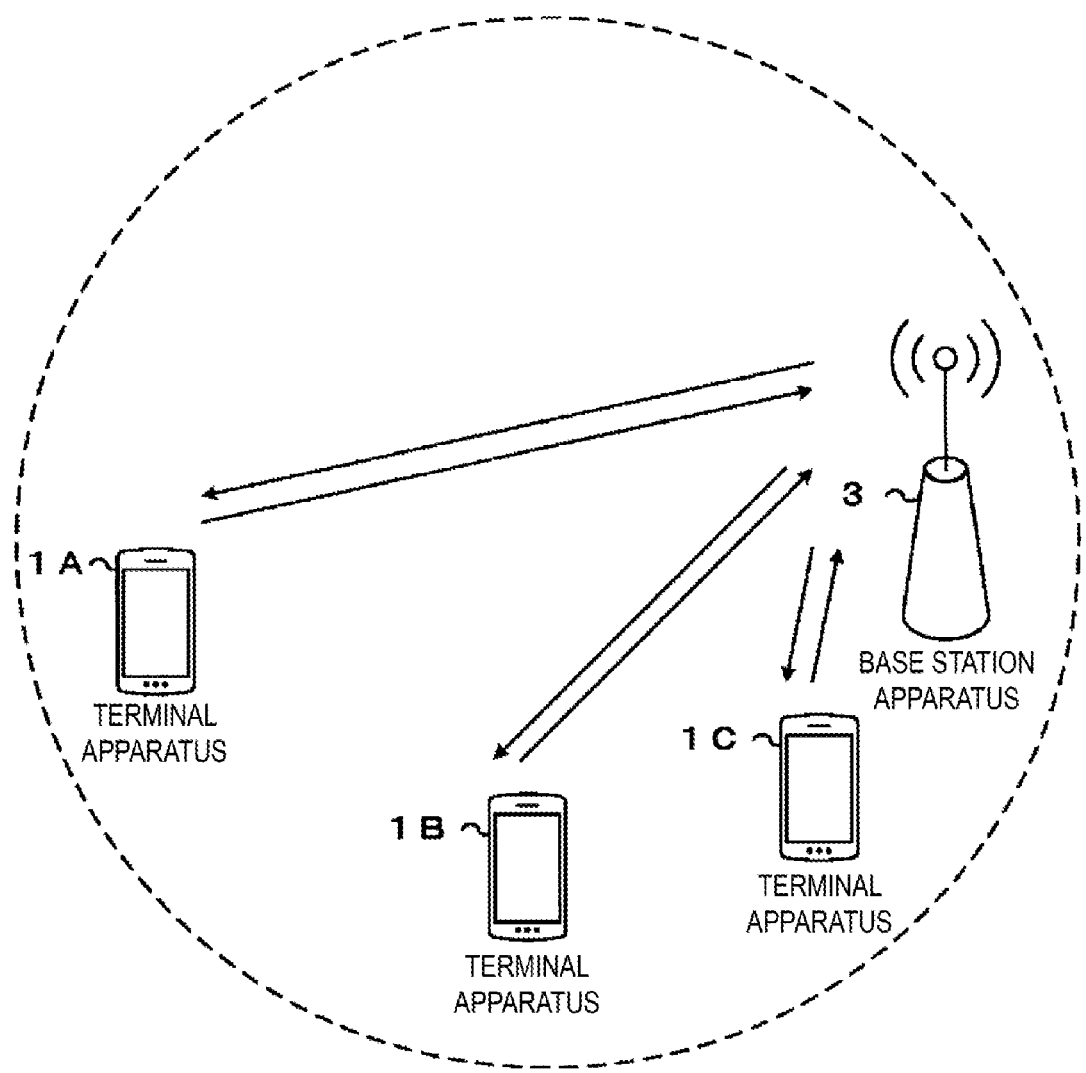
FIG. 1 is a conceptual diagram of a radio communication system according to an embodiment.

FIG. 1 is a conceptual diagram of a radio communication system according to the present embodiment. In FIG. 1, a radio communication system includes terminal apparatuses 1A to 1C and a base station apparatus 3. The terminal apparatuses 1A to 1C are each referred to as a terminal apparatus 1.

Hereinafter, carrier aggregation will be described.

A plurality of serving cells may be configured for the terminal apparatus 1. A technology in which the terminal apparatus 1 communicates via the plurality of serving cells is referred to as cell aggregation or carrier aggregation. An aspect of the present invention may be applied to each of the plurality of serving cells configured for the terminal apparatus 1. Furthermore, an aspect of the present invention may be applied to some of the plurality of serving cells configured. Furthermore, an aspect of the present invention may be applied to each group of the plurality of serving cells configured. Furthermore, an aspect of the present invention may be applied to some of the groups of the plurality of serving cells configured. In Carrier Aggregation, a plurality of serving cells thus configured may be referred to as aggregated serving cells.

Time Division Duplex (TDD) and/or Frequency Division Duplex (FDD) is applied to a radio communication system in the present embodiment. For cell aggregation, TDD may be applied to all multiple serving cells. Alternatively, for cell aggregation, serving cells to which TDD is applied and serving cells to which FDD is applied may be aggregated. In the present embodiment, serving cells to which TDD is applied are referred to as TDD serving cells, or serving cells using Frame structure Type 2.

A plurality of serving cells configured include one primary cell and one or a plurality of secondary cells. The primary cell is a serving cell in which an initial connection establishment procedure has been performed, a serving cell in which a connection re-establishment procedure has been started, or a cell indicated as a primary cell during a handover procedure. The secondary cell may be configured at a point of time when or after a Radio Resource Control (RRC) connection is established.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier. In TDD, a carrier corresponding to a serving cell in the uplink is the same as a carrier corresponding to a serving cell in the downlink.

The terminal apparatus 1 can perform simultaneous transmission on a plurality of physical channels/a plurality of physical signals in a plurality of TDD serving cells (component carriers) aggregated in the same band. The terminal apparatus 1 can perform simultaneous reception on a plurality of physical channels/a plurality of physical signals in a plurality of TDD serving cells (component carriers) aggregated in the same band.

Physical channels and physical signals in the present embodiment will be described.

In FIG. 1, in uplink radio communication from the terminal apparatus 1 to the base station apparatus 3, the following uplink physical channels are used. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is used to transmit uplink control information (UCI). The uplink control information includes: downlink Channel State Information (CSI); a Scheduling Request (SR) used to request for a PUSCH (Uplink-Shared Channel: UL-SCH) resource for initial transmission; and a Hybrid Automatic Repeat request ACKnowledgement (HARQ-ACK) for downlink data (a Transport block, a Medium Access Control Protocol Data Unit (MAC PDU), a Downlink-Shared Channel (DL-SCH), or a Physical Downlink Shared Channel (PDSCH)).

The PUSCH is used for transmission of uplink data (UpLink-Shared Channel (UL-SCH)). Furthermore, the PUSCH may be used to transmit the HARQ-ACK and/or channel state information along with the uplink data. Furthermore, the PUSCH may be used to transmit only the channel state information or to transmit only the HARQ-ACK and the channel state information.

To the PDSCH, any of Quadrature Phase Shift Keying (QPSK), 16 Quadrature Amplitude Modulation (QAM), 64 QAM, and 256 QAM is applied. QPSK is a modulation scheme, for data transmission, involving changing/adjusting the phase of carrier waves. QPSK is a modulation scheme, for data transmission, involving changing/adjusting the amplitude and the phase of in-phase carrier waves and quadrature carrier waves.

The modulation order of QPSK is 2. The modulation order of 16QAM is 4. The modulation order of 64QAM is 6. The modulation order of 256QAM is 8. The modulation order represents the number of bits transmitted with a single modulation symbol.

In the present embodiment, a symbol with a modulation order of 2 means a QPSK symbol, a symbol with a modulation order of 4 means 16QAM, a symbol with a modulation order of 6 means a 64QAM symbol, and a symbol with a modulation order of 8 means a 256QAM symbol. In other words, if the modulation order for a PUSCH is 2, QPSK is applied to the PUSCH; if the modulation order for a PUSCH is 4, 16QAM is applied to the PUSCH; if the modulation order for a PUSCH is 6, 64QAM is applied to the PUSCH; and if the modulation order for a PUSCH is 8, 256QAM is applied to the PUSCH.

The PRACH is used to transmit a random access preamble.

In FIG. 1, the following uplink physical signal is used in the uplink radio communication. The uplink physical signal is not used for transmitting information output from the higher layer, but is used by the physical layer.

Uplink Reference Signal (UL RS)

According to the present embodiment, the following two types of uplink reference signals are used.

Demodulation Reference Signal (DMRS)

Sounding Reference Signal/Symbol (SRS)

The DMRS is associated with transmission of the PUSCH or the PUCCH. The DMRS is time-multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS is not associated with the transmission of the PUSCH or the PUCCH. The base station apparatus 3 may use the SRS for measuring a channel state. The SRS is transmitted in the last single-carrier frequency division multiple access (SC-FDMA) symbol in the uplink subframe or an SC-FDMA symbol in UpPTS.

The SRS transmission is triggered by a higher layer signal, and/or DCI format. The trigger with the higher layer signal is also referred to as trigger type 0. The trigger with the DCI format is also referred to as trigger type 1.

The SRS corresponding to the trigger type 0 is transmitted using a first resource (subframe and SC-FDMA symbol) indicated by the higher layer signal. The SRS corresponding to the trigger type 1 is transmitted using a second resource (subframe and SC-FDMA symbol) indicated by the higher layer signal. In response to the trigger based on a single DCI format, the SRS corresponding to the trigger type 1 is transmitted only once.

One terminal apparatus 1 may transmit the SRS with each of a plurality of SC-FDMA symbols of one UpPTS. One terminal apparatus 1 may transmit the SRS corresponding to the trigger type 0 with each of a plurality of SC-FDMA symbols of one UpPTS. The plurality of SC-FDMA symbols of the one UpPTS are preferably contiguous in the time domain. The base station apparatus 3 may transmit information indicating the plurality of contiguous SC-FDMA symbols of the UpPTS as the first resource, to the terminal apparatus 1.

In FIG. 1, the following downlink physical channels are used for downlink radio communication from the base station apparatus 3 to the terminal apparatus 1. The downlink physical channels are used for transmitting information output from the higher layer.

Physical Broadcast Channel (PBCH)

Physical Control Format Indicator Channel (PCFICH)

Physical Hybrid automatic repeat request Indicator Channel (PHICH)

Physical Downlink Control Channel (PDCCH)

Enhanced Physical Downlink Control Channel (EPDCCH)

Physical Downlink Shared Channel (PDSCH)

Physical Multicast Channel (PMCH)

The PBCH is used for broadcasting a Master Information Block (MIB, a Broadcast Channel (BCH)) that is shared by the terminal apparatuses 1.

The PCFICH is used for transmission of information indicating a region (OFDM symbols) to be used for transmission of the PDCCH.

The PHICH is used for transmission of a HARQ indicator (HARQ feedback or response information) indicating an ACKnowledgement (ACK) or a Negative ACKnowledgement (NACK) for the uplink data (UpLink Shared Channel (UL-SCH)) received by the base station apparatus 3.

The PDCCH and the EPDCCH are used to transmit downlink control information (DCI). The downlink control information is also referred to as DCI format. The downlink control information includes a downlink grant and an uplink grant. The downlink grant is also referred to as a downlink assignment or a downlink allocation.

The downlink grant is used for scheduling of a single PDSCH within a single cell. The downlink grant is used for the scheduling of the PDSCH within the same subframe as the subframe on which the downlink grant is transmitted.

When no higher layer (RRC layer) parameter ttiBundling is configured, the uplink grant may be used for scheduling a single PUSCH within a single cell. The uplink grant is used for scheduling of a single PUSCH within the fourth or later subframe from the subframe in which the uplink grant is transmitted. The uplink grant transmitted on the PDCCH is also referred to as DCI format 0.

When a higher layer (RRC layer) parameter ttiBundling is configured, a single uplink grant may be used for scheduling transmission of four PUSCHes in four consecutive subframes within a single cell. A set of the four PUSCHes is also referred to as a bundle. Transmission of the four PUSCHes corresponds to the same HARQ process and the same transport block (uplink data). The transmission of the four PUSCHes may include one initial transmission and three non-adaptive retransmissions. The four consecutive subframes may include an uplink subframe and a special subframe. Note that the four consecutive subframes do not include a downlink subframe. In other words, a downlink subframe may exist between the four consecutive subframes. The three non-adaptive retransmissions are triggered without waiting for a feedback (uplink grant and HARQ feedback) for the preceding transmission.

The situation where the higher layer (RRC layer) parameter ttiBundling is configured is also referred to as a situation where subframe bundling operation is configured. The situation where the higher layer (RRC layer) parameter ttiBundling is configured is also referred to as the higher layer parameter (RRC layer) parameter ttiBundling is configured to be TRUE or ENABLE.

The CRC parity bits attached to a downlink grant or an uplink grant are scrambled with a Cell-Radio Network Temporary Identifier (C-RNTI), Temporary C-RNTI, or a Semi Persistent Scheduling Cell-Radio Network Temporary Identifier (SPS C-RNTI). The C-RNTI and the SPS C-RNTI are identifiers for identifying a terminal apparatus within a cell. The Temporary C-RNTI serves as an identifier used for identifying the terminal apparatus 1 that has transmitted a random access preamble in a contention-based random access procedure.

The C-RNTI and the Temporary C-RNTI are used to control the PDSCH or PUSCH in a single subframe. The SPS C-RNTI is used to periodically allocate a resource for the PDSCH or the PUSCH.

The PDSCH is used to transmit downlink data (downlink shared channel (DL-SCH)).

The PMCH is used to transmit multicast data (multicast channel (MCH)).

In FIG. 1, the following downlink physical signals are used for downlink radio communication. The downlink physical signals are not used for transmission of information output from the higher layer, but are used by the physical layer.

Synchronization signal (SS)
Downlink Reference sSignal (DL RS)

The synchronization signal is used for the terminal apparatus 1 to take synchronization in the frequency domain and the time domain in the downlink. In the TDD scheme, the synchronization signal is mapped to subframes 0, 1, 5, and 6 within a radio frame. In the FDD scheme, the synchronization signal is mapped to subframes 0 and 5 within a radio frame.

The downlink reference signal is used for the terminal apparatus 1 to perform channel compensation on a downlink physical channel. The downlink reference signal is used in order for the terminal apparatus 1 to obtain the downlink channel state information.

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The BCH, the MCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

The base station apparatus 3 and the terminal apparatus 1 exchange (transmit and/or receive) a signal in the higher layer. For example, the base station apparatus 3 and the terminal apparatus 1 may transmit and receive radio resource control (RRC) signaling (also referred to as RRC message or RRC information) in the RRC layer, respectively. Furthermore, the base station apparatus 3 and the terminal apparatus 1 may transmit and/or receive, in the Medium Access Control (MAC) layer, a MAC Control Element (CE). Here, the RRC signaling and/or the MAC CE is also referred to as higher layer signaling. The PUSCH and PDSCH are used to transmit the RRC signaling and the MAC CE.

Configurations of apparatuses according to the present embodiment will be described below.

Figure 2:
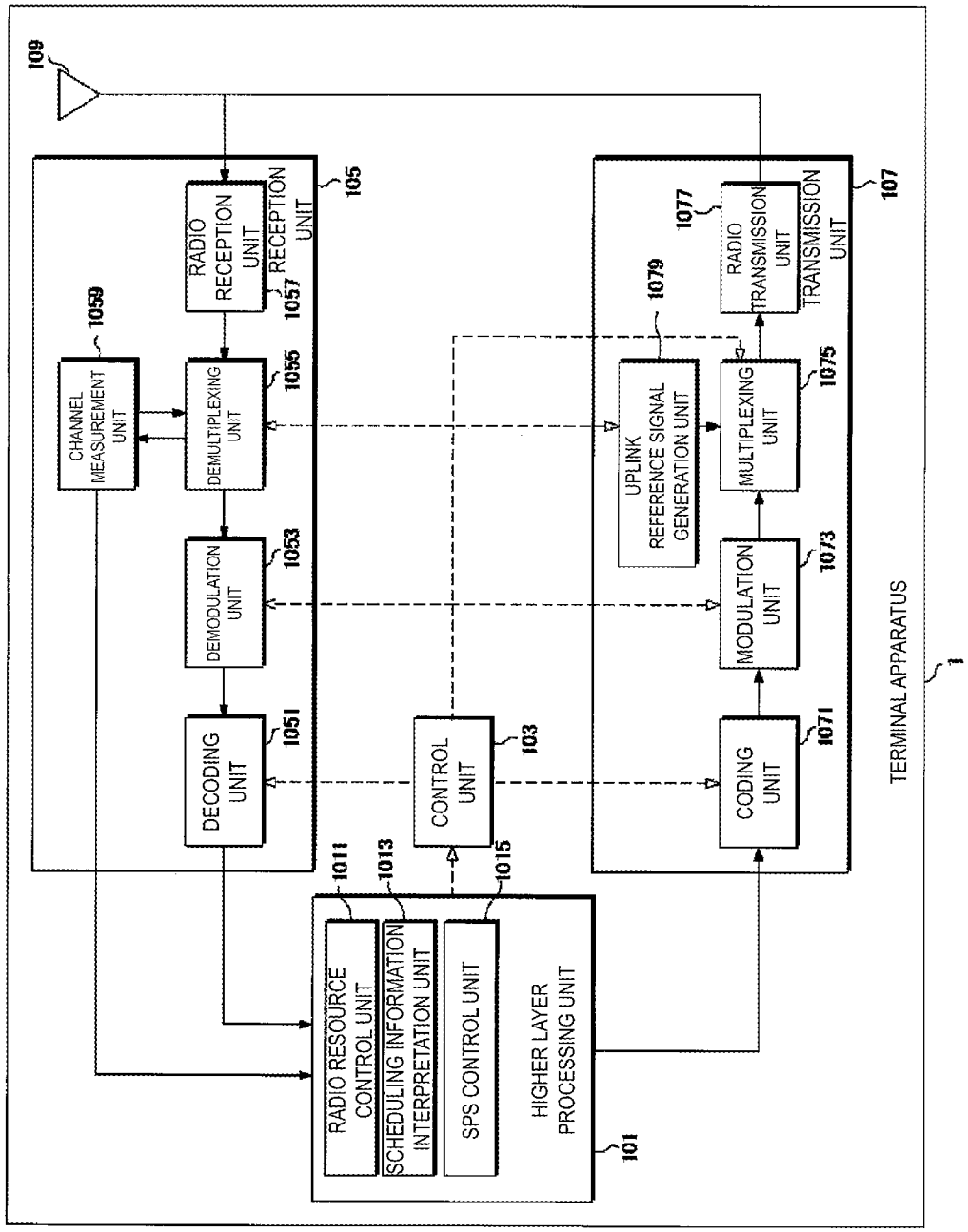
FIG. 2 is a schematic block diagram illustrating a configuration of a terminal apparatus 1 according to the present embodiment.

FIG. 2 is a schematic block diagram illustrating a configuration of the terminal apparatus 1 according to the present embodiment. As illustrated, the terminal apparatus 1 is configured to include a higher layer processing unit 101, a control unit 103, a reception unit 105, a transmission unit 107, and a transmit and receive antenna 109. The higher layer processing unit 101 is configured to include a radio resource control unit 1011, a scheduling information interpretation unit 1013, and a SPS control unit 1015. The reception unit 105 is configured to include a decoding unit 1051, a demodulation unit 1053, a demultiplexing unit 1055, a radio reception unit 1057, and a channel measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. Also, the higher layer processing unit 101 may perform processing of the medium access control (MAC) layer, the packet data convergence protocol (PDCP) layer, the radio link control (RLC) layer, and the radio resource control (RRC) layer.

The radio resource control unit 1011 included in the higher layer processing unit 101 manages various configuration information/parameters of the terminal apparatus 1 itself. The radio resource control unit 1011 sets the various configuration information/parameters in accordance with higher layer signaling received from the base station apparatus 3. To be more specific, the radio resource control unit 1011 sets the various configuration information/parameters in accordance with the information indicating the various configuration information/parameters received from the base station apparatus 3. Furthermore, the radio resource control unit 1011 generates information to be mapped to each uplink channel, and outputs the generated information to the transmission unit 107. The radio resource control unit 1011 is also referred to as a configuration unit 1011.

Here, the scheduling information interpretation unit 1013 included in the higher layer processing unit 101 interprets the DCI format (scheduling information) received through the reception unit 105, generates control information for control of the reception unit 105 and the transmission unit 107, in accordance with a result of interpreting the DCI format, and outputs the generated control information to the control unit 103.

The SPS control unit 1015 included in the higher layer processing unit 101 performs controls concerning the SPS, based on various configuration information, and information or conditions regarding the SPS such as parameters.

In accordance with the control information originating from the higher layer processing unit 101, the control unit 103 generates a control signal for control of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station apparatus 3 through the transmit and receive antenna 109, and outputs the information resulting from the decoding, to the higher layer processing unit 101.

The radio reception unit 1057 converts (down-converts) a downlink signal received through the transmit and receive antenna 109 into a baseband signal through orthogonal demodulation, removes unnecessary frequency components, controls an amplification level in such a manner as to suitably maintain a signal level, performs orthogonal demodulation, based on an in-phase component and an orthogonal component of the received signal, and converts the resulting orthogonally-demodulated analog signal into a digital signal. The radio reception unit 1057 removes a portion corresponding to a Cyclic Prefix (CP) from the digital signal resulting from the conversion, performs Fast Fourier Transform (FFT) on the signal from which the CP has been removed, and extracts a signal in the frequency domain.

The demultiplexing unit 1055 demultiplexes the extracted signal into the PHICH, the PDCCH, the EPDCCH, the PDSCH, and the downlink reference signal. Moreover, the demultiplexing unit 1055 makes a compensation of channels including the PHICH, the PDCCH, the EPDCCH, and the PDSCH, from a channel estimate input from the channel measurement unit 1059. Furthermore, the demultiplexing unit 1055 outputs the downlink reference signal resulting from the demultiplexing, to the channel measurement unit 1059.

The demodulation unit 1053 multiplies the PHICH by a corresponding code for composition, demodulates the resulting composite signal in compliance with a Binary Phase Shift Keying (BPSK) modulation scheme, and outputs a result of the demodulation to the decoding unit 1051. The decoding unit 1051 decodes the PHICH destined for the terminal apparatus 1 itself and outputs the HARQ indicator resulting from the decoding to the higher layer processing unit 101. The demodulation unit 1053 demodulates the PDCCH and/or the EPDCCH in compliance with a QPSK modulation scheme and outputs a result of the demodulation to the decoding unit 1051. The decoding unit 1051 attempts to decode the PDCCH and/or the EPDCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as Quadrature Phase Shift Keying (QPSK), 16 Quadrature Amplitude Modulation (QAM), or 64 QAM, and outputs a result of the demodulation to the decoding unit 1051. The decoding unit 1051 decodes the data in accordance with information of a coding rate notified with the downlink control information, and outputs, to the higher layer processing unit 101, the downlink data (the transport block) resulting from the decoding.

The channel measurement unit 1059 measures a downlink path loss or a channel state from the downlink reference signal input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055. The channel measurement unit 1059 performs channel measurement and/or interference measurement in order to calculate the CQI (or the CSI).

The transmission unit 107 generates the uplink reference signal in accordance with the control signal input from the control unit 103, codes and modulates the uplink data (the transport block) input from the higher layer processing unit 101, multiplexes the PUCCH, the PUSCH, and the generated uplink reference signal, and transmits a result of the multiplexing to the base station apparatus 3 through the transmit and receive antenna 109. Furthermore, the transmission unit 107 transmits uplink control information.

The coding unit 1071 performs coding, such as convolutional coding or block coding, on the uplink control information input from the higher layer processing unit 101. Furthermore, the coding unit 1071 performs turbo coding in accordance with information used for the scheduling of the PUSCH.

The modulation unit 1073 modulates coded bits input from the coding unit 1071, in compliance with the modulation scheme notified with the downlink control information, such as BPSK, QPSK, 16 QAM, or 64 QAM, or in compliance with a modulation scheme predetermined in advance for each channel. In accordance with the information used for the scheduling of the PUSCH, the modulation unit 1073 determines the number of data sequences to be spatial-multiplexed, maps multiple pieces of uplink data to be transmitted on the same PUSCH to multiple sequences through Multiple Input Multiple Output Spatial Multiplexing (MIMO SM), and performs precoding on the sequences.

The uplink reference signal generation unit 1079 generates a sequence acquired in accordance with a rule (formula) predetermined in advance, based on a physical layer cell identifier (also referred to as a Physical Cell Identity (PCI), a Cell ID, or the like) for identifying the base station apparatus 3, a bandwidth to which the uplink reference signal is mapped, a cyclic shift notified with the uplink grant, a parameter value for generation of a DMRS sequence, and the like. In accordance with the control signal input from the control unit 103, the multiplexing unit 1075 rearranges modulation symbols of the PUSCH in parallel and then performs Discrete Fourier Transform (DFT) on the rearranged modulation symbols. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmission unit 1077 performs Inverse Fast Fourier Transform (IFFT) on a signal resulting from the multiplexing, generates an SC-FDMA symbol, attaches a CP to the generated SC-FDMA symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 109 for transmission.

Figure 3:
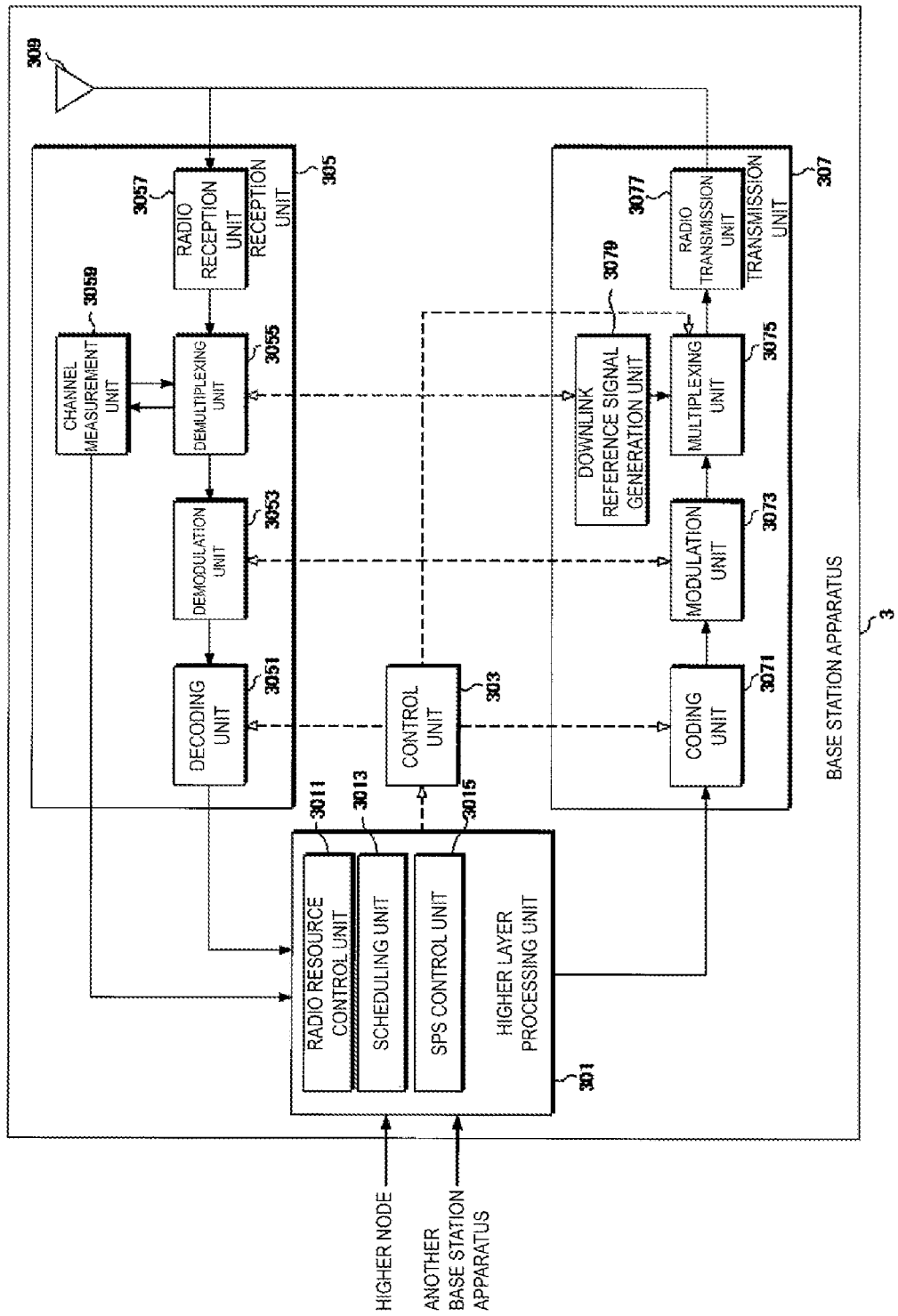
FIG. 3 is a schematic block diagram illustrating a configuration of a base station apparatus 3 according to the present embodiment.

FIG. 3 is a schematic block diagram illustrating a configuration of the base station apparatus 3 according to the present embodiment. As illustrated in the figure, the base station apparatus 3 is configured to include a higher layer processing unit 301, a control unit 303, a reception unit 305, a transmission unit 307, and a transmit and receive antenna 309. The higher layer processing unit 301 is configured to include a radio resource control unit 3011, a scheduling unit 3013, and a SPS control unit 3015. The reception unit 305 is configured to include a decoding unit 3051, a demodulation unit 3053, a demultiplexing unit 3055, a radio reception unit 3057, and a channel measurement unit 3059. The transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the reception unit 305 and the transmission unit 307, and outputs the generated control information to the control unit 303.

The radio resource control unit 3011 included in the higher layer processing unit 301 generates, or acquires from a higher node, the downlink data (the transport block) mapped to the downlink PDSCH, system information, the RRC message, the MAC Control Element (CE), and the like, and outputs a result of the generation or the acquirement to the transmission unit 307. Furthermore, the radio resource control unit 3011 manages various configuration information/parameters for each of the terminal apparatuses 1. The radio resource control unit 3011 may configure various configuration information/parameters for each of the terminal apparatuses 1 through higher layer signaling. In other words, the radio resource control unit 1011 transmits/broadcasts information indicating various configuration information/parameters. The radio resource control unit 3011 is also referred to as a configuration unit 3011.

The scheduling unit 3013 included in the higher layer processing unit 301 determines a frequency and a subframe to which the physical channels (PDSCH and PUSCH) are allocated, the coding rate and modulation scheme for the physical channels (PDSCH and PUSCH), the transmit power, and the like, from the received channel state information and from the channel estimate, channel quality, or the like input from the channel measurement unit 3059. The scheduling unit 3013 generates the control information (e.g., the DCI format) in order to control the reception unit 305 and the transmission unit 307 in accordance with a result of the scheduling, and outputs the generated information to the control unit 303. The scheduling unit 3013 further determines timing of performing transmission processing and reception processing.

The SPS control unit 3015 included in the higher layer processing unit 301 performs controls concerning the SPS, based on various configuration information, and information or conditions regarding the SPS such as parameters.

In accordance with the control information originating from the higher layer processing unit 301, the control unit 303 generates a control signal for control of the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal apparatus 1 through the transmit and receive antenna 309, and outputs information resulting from the decoding to the higher layer processing unit 301. The radio reception unit 3057 converts (down-converts) an uplink signal received through the transmit and receive antenna 309 into a baseband signal through orthogonal demodulation, removes unnecessary frequency components, controls the amplification level in such a manner as to suitably maintain a signal level, performs orthogonal demodulation, based on an in-phase component and an orthogonal component of the received signal, and converts the resulting orthogonally-demodulated analog signal into a digital signal. The reception unit 305 receives the uplink control information.

The radio reception unit 3057 removes a portion corresponding to a Cyclic Prefix (CP) from the digital signal resulting from the conversion. The radio reception unit 3057 performs Fast Fourier Transform (FFT) on the signal from which the CP has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. The demultiplexing is performed based on radio resource allocation information that is determined in advance by the base station apparatus 3 using the radio resource control unit 3011 and that is included in the uplink grant notified to each of the terminal apparatuses 1. Furthermore, the demultiplexing unit 3055 makes a compensation of channels including the PUCCH and the PUSCH from the channel estimate input from the channel measurement unit 3059. Furthermore, the demultiplexing unit 3055 outputs an uplink reference signal resulting from the demultiplexing, to the channel measurement unit 3059.

The demodulation unit 3053 performs Inverse Discrete Fourier Transform (IDFT) on the PUSCH, acquires modulation symbols, and performs reception signal demodulation, that is, demodulates each of the modulation symbols on the PUCCH and the PUSCH, in compliance with the modulation scheme predetermined in advance, such as Binary Phase Shift Keying (BPSK), QPSK, 16 QAM, or 64 QAM, or in compliance with the modulation scheme that the base station apparatus 3 itself notified in advance with the uplink grant each of the terminal apparatuses 1. The demodulation unit 3053 demultiplexes the modulation symbols of multiple pieces of uplink data transmitted on the same PUSCH with the MIMO SM, based on the number of spatial-multiplexed sequences notified in advance with the uplink grant to each of the terminal apparatuses 1 and information designating the precoding to be performed on the sequences.

The decoding unit 3051 decodes the coded bits of the PUCCH and the PUSCH, which have been demodulated, at the coding rate in compliance with a coding scheme predetermined in advance, the coding rate being predetermined in advance or being notified in advance with the uplink grant to the terminal apparatus 1 by the base station apparatus 3 itself, and outputs the decoded uplink data and uplink control information to the higher layer processing unit 101. In a case where the PUSCH is re-transmitted, the decoding unit 3051 performs the decoding with the coded bits input from the higher layer processing unit 301 and retained in an HARQ buffer, and the demodulated coded bits. The channel measurement unit 309 measures the channel estimate, the channel quality, and the like, based on the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the terminal apparatus 1 through the transmit and receive antenna 309.

The coding unit 3071 codes the HARQ indicator, the downlink control information, and the downlink data that are input from the higher layer processing unit 301, in compliance with the coding scheme predetermined in advance, such as block coding, convolutional coding, or turbo coding, or in compliance with the coding scheme determined by the radio resource control unit 3011. The modulation unit 3073 modulates the coded bits input from the coding unit 3071, in compliance with the modulation scheme predetermined in advance, such as BPSK, QPSK, 16 QAM, or 64 QAM, or in compliance with the modulation scheme determined by the radio resource control unit 3011.

The downlink reference signal generation unit 3079 generates, as the downlink reference signal, a sequence that is already known to the terminal apparatus 1 and that is acquired in accordance with a rule predetermined in advance, based on the Physical layer Cell Identifier (PCI) for identifying the base station apparatus 3, and the like. The multiplexing unit 3075 multiplexes the modulated modulation symbol of each channel and the generated downlink reference signal. To be more specific, the multiplexing unit 3075 maps the modulated modulation symbol of each channel and the generated downlink reference signal to the resource elements.

The radio transmission unit 3077 performs Inverse Fast Fourier Transform (IFFT) on the modulation symbol resulting from the multiplexing or the like, generates an OFDM symbol, attaches a CP to the generated OFDM symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 309 for transmission.

Each of the units included in the terminal apparatus 1 may be configured as a circuit. Each of the units included in the base station apparatus 3 may be configured as a circuit.

Figure 4:
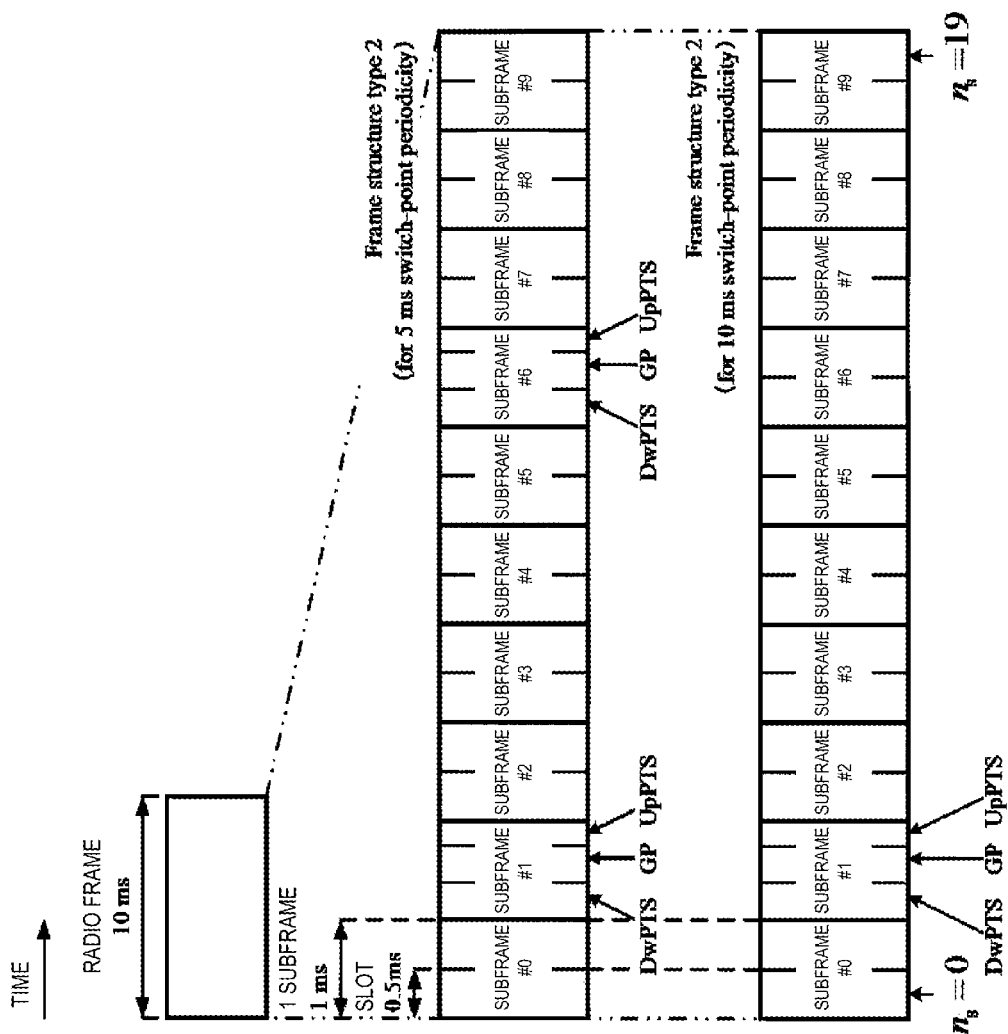
FIG. 4 is a diagram illustrating a schematic configuration of a radio frame of Frame structure Type 2 according to the present embodiment.

FIG. 4 is a diagram illustrating a schematic configuration of a radio frame of Frame structure Type 2 according to the present embodiment. Frame structure Type 2 is applicable to TDD. In FIG. 4, the horizontal axis is a time axis.

For example, the field size in the time domain is expressed by the number of time units $T_s=1/(15000 \cdot 2048)$ seconds. The length of a radio frame in Frame structure Type 2 is $T_f=307200 \cdot T_s=10$ ms. Each of the radio frames of Frame structure Type 2 includes two contiguous half frames in the time domain. The length of each of the half frames is $T_{half-frame}=153600 \cdot T_s=5$ ms. Each of the half frames includes five contiguous subframes in the time domain. The length of each of the subframes is $T_{subframe}=30720 \cdot T_s=1$ ms. Each of subframes i includes two contiguous slots in the time domain. The two contiguous slots in the time domain are a slot having a slot number $n_s$ of 2i in the radio frame and a slot having a slot number $n_s$ of 2i+1 in the radio frame. The length of each of the slots is $T_{slot}=153600 \cdot n_s=0.5$ ms. Each of the radio frames includes ten contiguous subframes in the time domain. Each of the radio frames includes 20 contiguous slots ($n_s=0, 1, \ldots, 19$) in the time domain.

Figure 5:
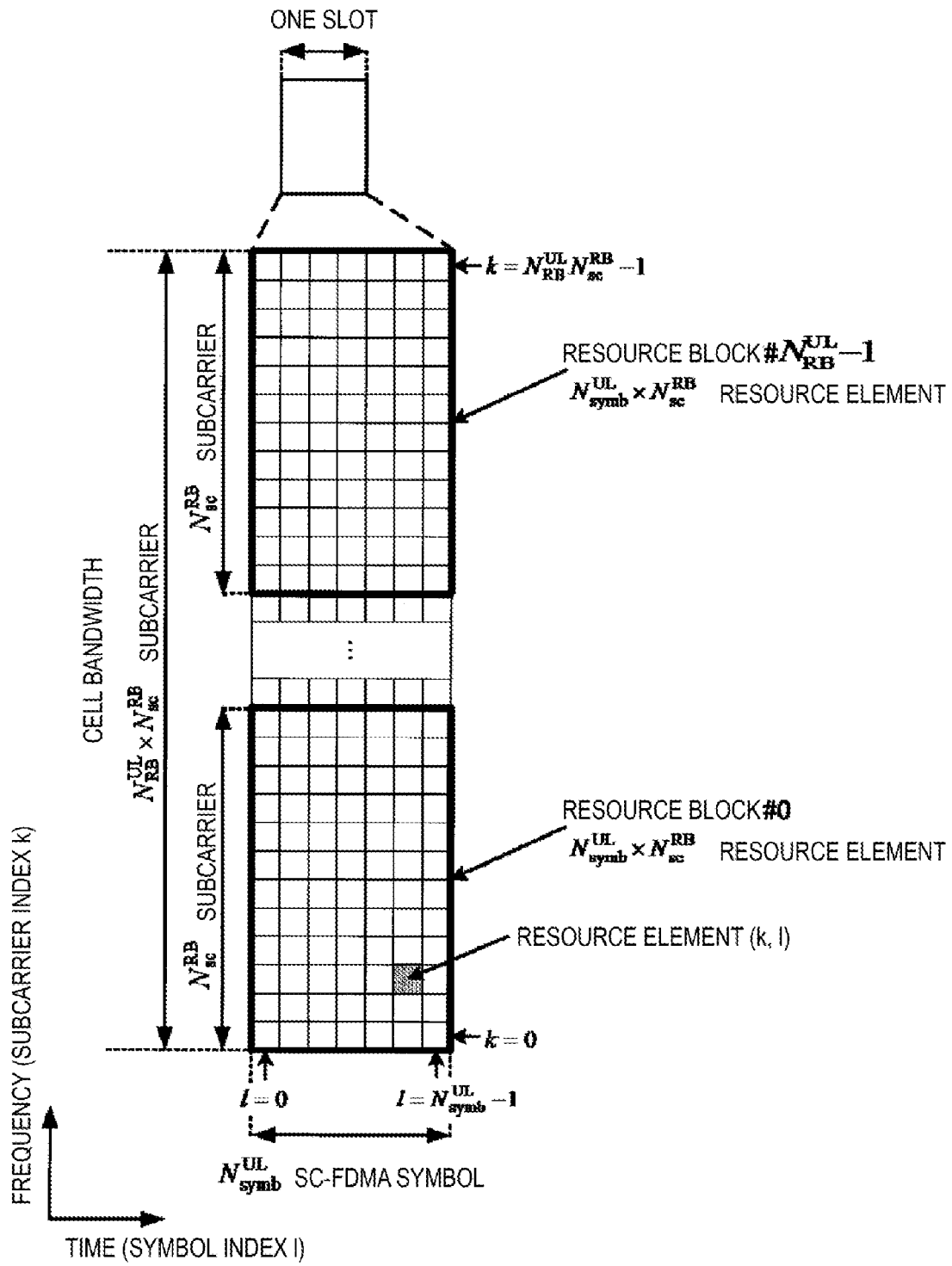
FIG. 5 is a diagram illustrating a schematic configuration of an uplink slot according to the present embodiment.

A configuration of a slot according to the present embodiment will be described below. FIG. 5 is a diagram illustrating a schematic configuration of an uplink slot according to the present embodiment. FIG. 5 illustrates a configuration of an uplink slot in a cell. In FIG. 5, the horizontal axis represents a time axis, and the vertical axis represents a frequency axis. In FIG. 5, l is an SC-FDMA symbol number/index, and k is a subcarrier number/index.

The physical signal or the physical channel transmitted in each of the slots is expressed by a resource grid. In uplink, the resource grid is defined by multiple subcarriers and multiple SC-FDMA symbols. Each element within the resource grid is referred to as a resource element. The resource element is expressed by a subcarrier number/index k and an SC-FDMA symbol number/index l.

The resource grid is defined for each antenna port. In the present embodiment, description is given for one antenna port. The present embodiment may be applied to each of multiple antenna ports.

The uplink slot includes multiple SC-FDMA symbols l ($l=0, 1, \ldots, N^{UL}_{symb}$) in the time domain. $N^{UL}_{symb}$ indicates the number of SC-FDMA symbols included in one uplink slot. For a normal Cyclic Prefix (CP) in the uplink, $N^{UL}_{symb}$ is 7. For an extended CP in the uplink, $N^{UL}_{symb}$ is 6.

The terminal apparatus 1 receives the parameter UL-CyclicPrefixLength indicating the CP length in the uplink from the base station apparatus 3. The base station apparatus 3 may broadcast, in the cell, system information including the parameter UL-CyclicPrefixLength corresponding to the cell.

FIG. 6 is a diagram illustrating an example of an uplink cyclic prefix configuration according to the present embodiment. $N_{CP,l}$ represents the uplink CP length for the SC-FDMA symbol l in the slot. When the uplink cyclic prefix configuration (UL-CyclicPrefixLength) is the normal CP, $N_{CP,0}=160$ holds true for l=0. The length of the SC-FDMA symbol l not including the CP length is $2048 \cdot T_s$, and the length of the SC-FDMA symbol l including the CP length is $(N_{CP,l}+2048) \cdot T_s$.

The uplink slot includes the plurality of subcarriers k ($k=0, 1, \ldots, N^{UL}_{RB} \cdot N^{RB}_{sc}$) in the frequency domain. $N^{UL}_{RB}$ is an uplink bandwidth configuration for the serving cell expressed by a multiple of $N^{RB}_{sc}$. $N^{RB}_{sc}$ is a (physical) resource block size in the frequency domain expressed by the number of subcarriers. In the present embodiment, a subcarrier interval Δf is 15 kHz, $N^{RB}_{sc}$ is 12. In other words, in the present embodiment, $N^{RB}_{sc}$ is 180 kHz.

A resource block is used to express mapping of a physical channel to resource elements. For the resource block, a virtual resource block and a physical resource block are defined. A physical channel is first mapped to a virtual resource block. Thereafter, the virtual resource block is mapped to the physical resource block. One physical resource block is defined by $N^{UL}_{symb}$ consecutive SC-FDMA symbols in the time domain and by $N^{RB}_{sc}$ consecutive subcarriers in the frequency domain. Hence, one physical resource block is constituted by ($N^{UL}_{symb} \cdot N^{RB}_{sc}$) resource elements. One physical resource block corresponds to one slot in the time domain. The physical resource blocks may be numbered (0, 1, \ldots, $N^{UL}_{RB}-1$) in ascending order of frequencies in the frequency domain.

The downlink slot according to the present embodiment includes multiple OFDM symbols. Since the configuration of the downlink slot according to the present embodiment is basically the same as the configuration of the uplink slot except that the resource grid in the downlink slot is defined by multiple subcarriers and multiple OFDM symbols, the description of the configuration of the downlink slot will be omitted.

In the TDD serving cell, values of the uplink bandwidth configuration and the downlink bandwidth configuration for the TDD serving cell are the same.

A resource block is used to express mapping of a certain physical channel (such as the PDSCH or the PUSCH) to resource elements. For the resource block, a virtual resource block and a physical resource block are defined. A certain physical channel is first mapped to a virtual resource block. Thereafter, the virtual resource block is mapped to the physical resource block. One physical resource block is defined by seven consecutive OFDM symbols or SC-FDMA symbols in the time domain and by 12 consecutive subcarriers in the frequency domain. Hence, one physical resource block includes (7×12) resource elements. Furthermore, one physical resource block corresponds to one slot in the time domain and corresponds to 180 kHz in the frequency domain. Physical resource blocks are numbered from 0 in the frequency domain.

The time-continuous signal $s_l(t)$ in the SC-FDMA symbol l of the uplink slot is given by Equation (1). Equation (1) is applied to an uplink physical signal and an uplink physical channel excluding the PRACH.

$$s_l(t) = \sum_{k=-\lfloor N_{RB}^{UL} N_{sc}^{RB}/2 \rfloor}^{\lfloor N_{RB}^{UL} N_{sc}^{RB}/2 \rfloor - 1} a_{k^{(-)},l} \cdot e^{j2\pi(k+1/2)\Delta f(t-N_{CP,l}T_s)} \quad \text{Equation (1)}$$

for $0 \leq t < (N_{CP,l} + 2048) \times T_s$ where $k^{(-)} = k + \lfloor N_{RB}^{UL} N_{sc}^{RB}/2 \rfloor$ and $\Delta f = 15$ kHz In the equation, $a_{k,l}$ represents the content of a resource element (k,l). The SC-FDMA symbol in a slot is transmitted in an ascending order of l, starting from l=0. The SC-FDMA symbol l>0 in a slot starts at time defined by Equation (2).

$$\Sigma_{l'=0}^{l-1}(N_{CP,l'}+N)T_s \quad \text{Equation (2)}$$

An uplink-downlink configuration (UL-DL configuration) according to the present embodiment will be described.

Following three types of subframes are defined for Frame structure Type 2.
  Downlink subframe
  Uplink subframe
  Special subframe The downlink subframe is a subframe reserved for the downlink transmission. The uplink subframe is a subframe reserved for the uplink transmission. The special subframe is constituted of three fields. The three fields are a Downlink Pilot Time Slot (DwPTS), a Guard Period (GP), and an Uplink Pilot Time Slot (UpPTS). The sum of lengths of the DwPTS, the GP, and the UpPTS is 1 ms. The DwPTS is a field reserved for the downlink transmission. The UpPTS is a field reserved for the uplink transmission. The GP is a field in which neither the downlink transmission nor the uplink transmission is performed. Moreover, the special subframe may be constituted of only the DwPTS and the GP, or may be constituted of only the GP and the UpPTS.

A radio frame of Frame structure Type 2 is constituted of at least the downlink subframe, the uplink subframe, and the special subframe. The constitution of the radio frame of Frame structure Type 2 is indicated by an UL/DL configuration. The terminal apparatus 1 receives information indicating the UL/DL configuration from the base station apparatus 3. The base station apparatus 3 may broadcast, in the cell, system information including information indicating UL/DL configuration corresponding to the cell.

FIG. 7 is a table illustrating an UL/DL configuration in the present embodiment. FIG. 7 indicates an UL/DL configuration in a single radio frame. In FIG. 7, D denotes a downlink subframe, U denotes an uplink subframe, and S denotes a special subframe.

According to FDD, all subframes are downlink subframes. According to FDD, all subframes are uplink subframes.

Figure 8:
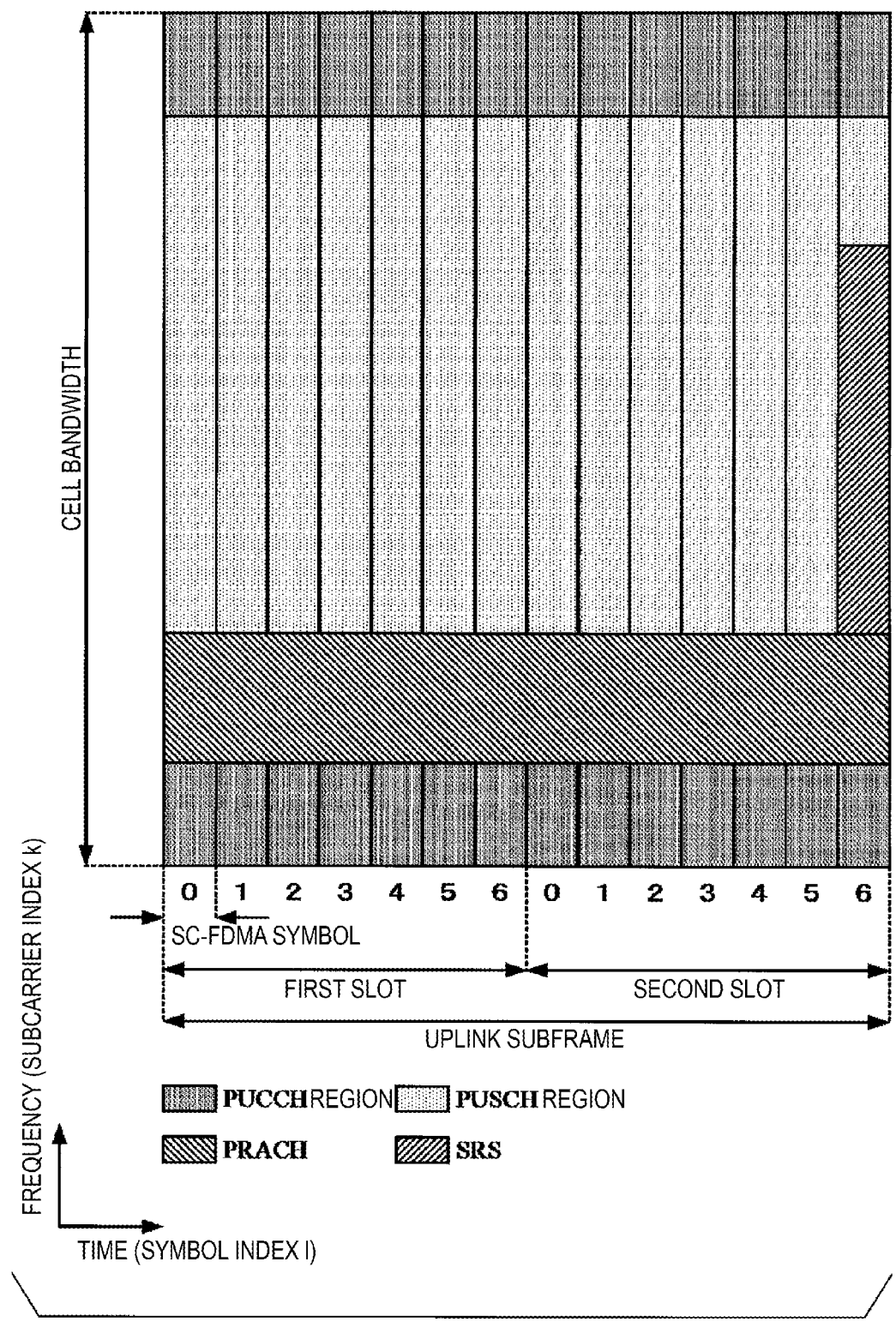
FIG. 8 is a diagram illustrating an example of an uplink subframe according to the present embodiment.
Figure 9:
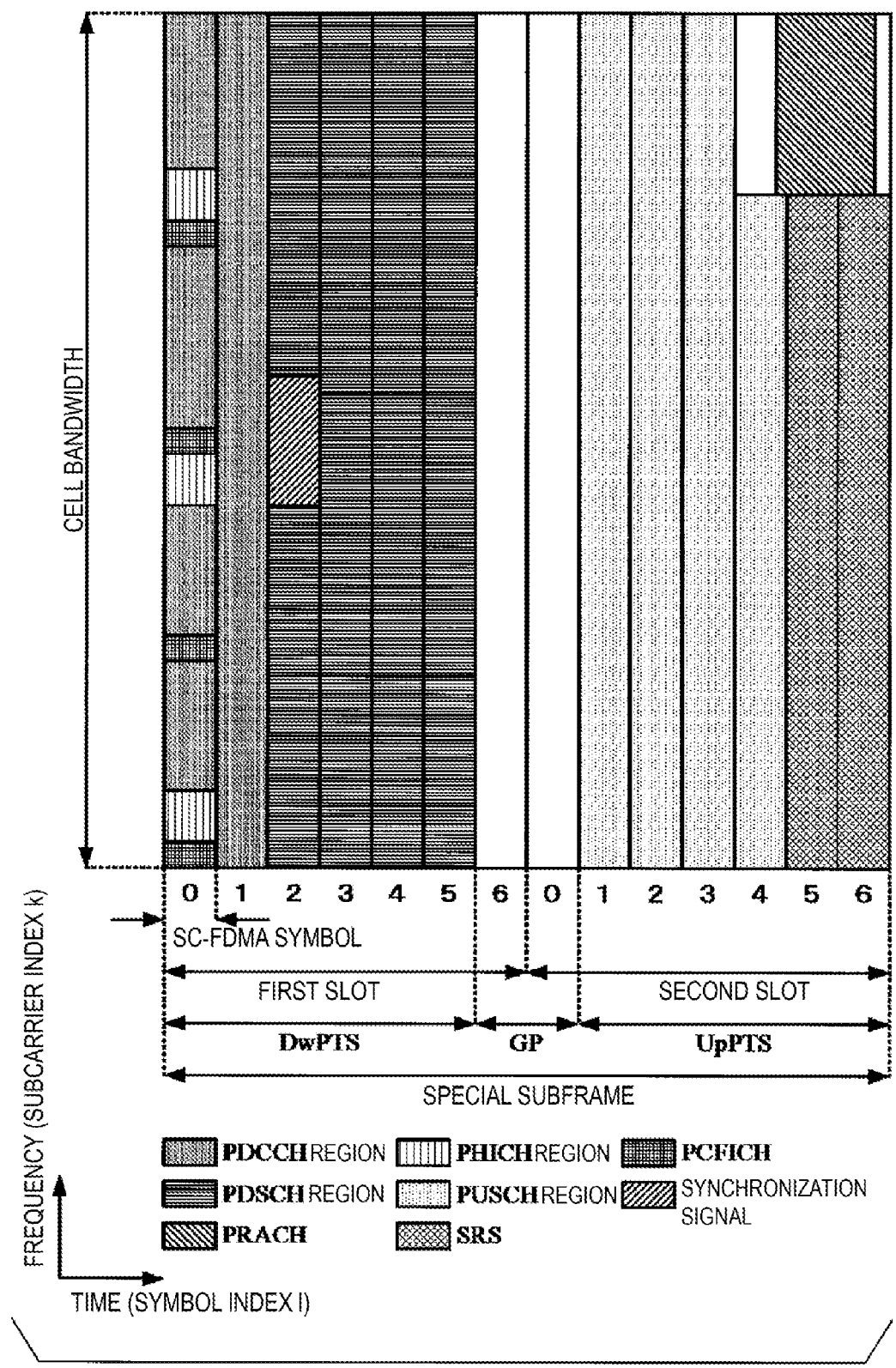
FIG. 9 is a diagram illustrating an example of a special subframe according to the present embodiment.

FIG. 8 is a diagram illustrating an example of an uplink subframe according to the present embodiment. FIG. 9 is a diagram illustrating an example of a special subframe according to the present embodiment. In FIG. 8 and FIG. 9, the horizontal axis is a time axis, and the vertical axis is a frequency axis. In FIG. 8 and FIG. 9, the downlink cyclic prefix configuration and the uplink cyclic prefix configuration are normal cyclic prefixes.

The DwPTS includes the first symbol of the special subframe. The UpPTS includes the last symbol of the special subframe. The GP exists between the DwPTS and the UpPTS. The terminal apparatus 1 may shift from downlink reception processing to uplink transmission processing during the GP. In the UpPTS, the PUSCH, the SRS, and the PRACH are transmitted.

FIG. 10 is a diagram illustrating an example of a special subframe configuration for the normal CP in a downlink according to the present embodiment. When the special subframe configuration for the normal CP in a downlink is 0, the length of DwPTS is 6592·$T_s$, and DwPTS includes three OFDM symbols including the normal CP. When the special subframe configuration for the normal CP in a downlink is 0 and the uplink cyclic prefix configuration is the normal CP, the length of the UpPTS is (1+X)·2192·$T_s$ and the UpPTS includes (1+X) SC-FDMA symbols including the normal CP.

X represents the number of added SC-FDMA symbols in the UpPTS. The value X may be given based on a parameter UpPtsAdd of the RRC layer received from the base station apparatus 3. The default value of X may be 0. In other words, the value X may be 0, if the value X is not configured with a parameter of the RRC layer. The added SC-FDMA symbols are also referred to as expanded SC-FDMA symbols. In (1+X), 1 indicates the number of SC-FDMA symbols not added in the UpPTS based on the parameter UpPtsAdd of the RRC layer.

The parameter UpPtsAdd of the RRC layer may include a parameter srs-UpPtsAdd, a parameter pusch-UpPtsAdd, and a parameter pucch-UpPtsAdd. The SRS may be transmitted on the UpPTS added based on the parameter srs-UpPtsAdd. No PUSCH or PUCCH is transmitted on the UpPTS added based on the parameter srs-UpPtsAdd. The PUSCH and the SRS may be transmitted on the UpPTS added based on the parameter pusch-UpPtsAdd. No PUCCH is transmitted on the UpPTS added based on the parameter pusch-UpPtsAdd. The PUSCH, the PUCCH, and the SRS may be transmitted on the UpPTS added based on the parameter pucch-UpPtsAdd.

The SRS may be transmitted on the UpPTS not added based on the parameter UpPtsAdd of the RRC layer. No PUSCH or PUCCH is transmitted on the UpPTS not added in the parameter UpPtsAdd of the RRC layer.

In other words, the base station apparatus 3 may use a parameter of the RRC layer to determine whether the terminal apparatus 1 can transmit the PUSCH and the PUCCH in the added UpPTS field.

For example, when the value of the parameter puschUPtsAdd is 6, the value of (Y+X) is 6. The value Y is 1 or 2. When the special subframe configuration is 0, the value Y is 1 and the value X is 5. When the special subframe configuration is 5 or 9, the value Y is 2 and the value X is 4.

The parameter UpPtsAdd may include a parameter indicating the special subframe corresponding to the parameter UpPtsAdd. For a certain serving cell, the parameter UpPtsAdd may be applied to all the special subframes. For a certain serving cell, the parameter UpPtsAdd may be applied to some of the special subframes. For example, the parameter UpPtsAdd may be applied to the special subframe with the subframe number 1, and may not be applied to the special subframe with the subframe number 6. In other words, the special subframe with the subframe number 1 may include the added UpPTS, and the special subframe with the subframe number 6 may include the not-added UpPTS.

Figure 11A:
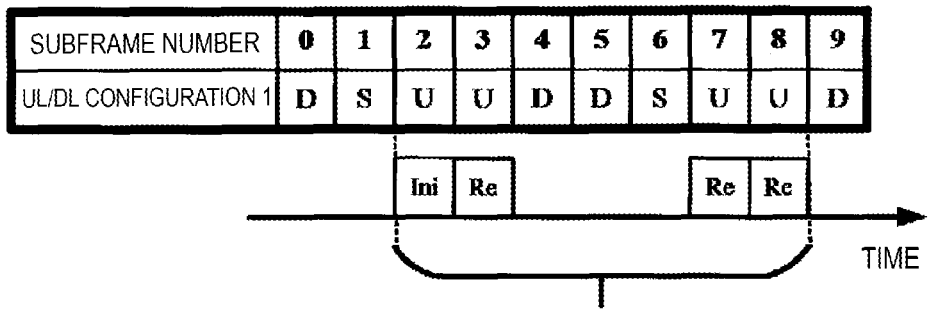
FIG. 11A to 11C are diagrams, each illustrating an example of a bundle according to the present embodiment.
Figure 11B:
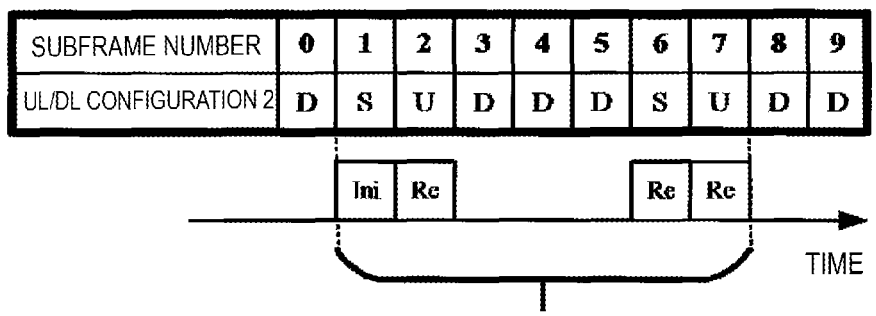
Figure 11C:
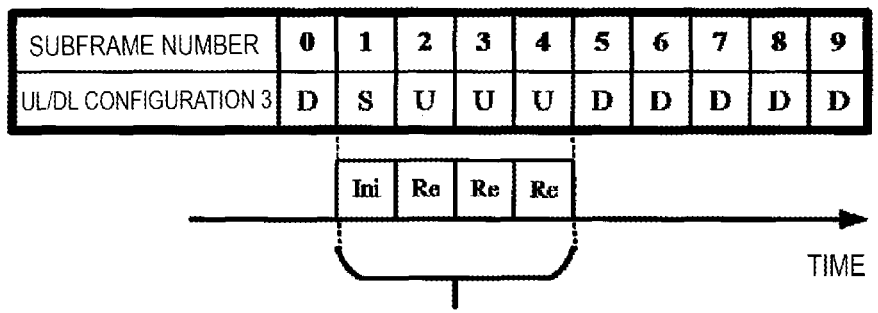
Figure 11C:
Figure 11C:

FIGS. 11A to 11C are diagrams, each illustrating an example of a bundle according to the present embodiment. In FIGS. 11A to 11C, a rectangle denoted with Ini indicates the initial PUSCH transmission (initial transmission) in a bundle, and rectangles denoted with Re indicate second, third, and fourth PUSCH transmissions (non-adaptive retransmissions) in the bundle.

In FIG. 11A, the UL/DL configuration is 1, and the bundle 11A corresponds to a subframe {2,3,7,8}. In FIG. 11A, a subframe {2,3,7,8} is an uplink subframe.

In FIG. 11B, the UL/DL configuration is 2, and the bundle 11B corresponds to a subframe {1,2,6,7}. In FIG. 11B, a subframe {2,7} is an uplink subframe, and a subframe {1,6} is a special subframe.

In FIG. 11C, the UL/DL configuration is 3, and the bundle 11C corresponds to a subframe {1,2,3,4}. In FIG. 11C, the subframe {2,3,4} is an uplink subframe, and a subframe {1} is a special subframe.

In other words, the number of special subframes and the number of uplink subframes included in the same bundle may be different among the bundles.

Figures 12, 13:
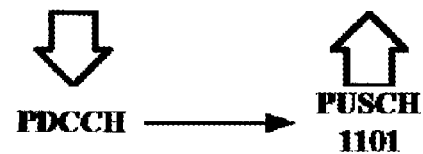
FIG. 12 illustrates a first example of relationship between a subframe in which the PDCCH is detected and a subframe in which the corresponding PUSCH transmission is adjusted and performed according to the present embodiment.
FIG. 13 illustrates a first example of relationship between a subframe in which the PDCCH is detected and a subframe in which the corresponding PUSCH transmission is adjusted and performed according to the present embodiment.
Figures 14, 15:
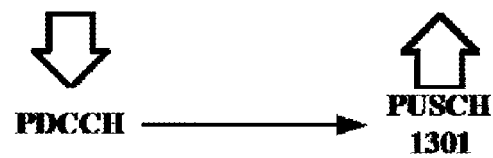
FIG. 14 illustrates a second example of relationship between a subframe in which the PDCCH is detected and a subframe in which the corresponding PUSCH transmission is adjusted and performed according to the present embodiment.
FIG. 15 illustrates a second example of relationship between a subframe in which the PDCCH is detected and a subframe in which the corresponding PUSCH transmission is adjusted and performed according to the present embodiment.

FIG. 12 and FIG. 13 illustrate a first example of relationship between a subframe in which the PDCCH is detected and a subframe in which the corresponding PUSCH transmission is adjusted and performed according to the present embodiment. FIG. 14 and FIG. 15 illustrate a second example of relationship between a subframe in which the PDCCH is detected and a subframe in which the corresponding PUSCH transmission is adjusted and performed according to the present embodiment. Here, the PDCCH includes downlink control information.

Based on detection of a PDCCH including downlink control information in a subframe n, the terminal apparatus 1 adjusts the PUSCH transmission corresponding to the PDCCH to be in a subframe n+k. The value k is given at least in accordance with the UL/DL configuration. Based on the detection of the PDCCH including downlink control information in the subframe n, the terminal apparatus 1 adjusts the first PUSCH transmission in the bundle corresponding to the PDCCH to be in the subframe n+k. The value k is given at least in accordance with the UL/DL configuration.

When the special subframe configuration 10, the parameter pusch-UpPtsAdd, and the parameter pucch-UpPtsAdd are not configured for the terminal apparatus 1, the value k may be given at least based on FIG. 12. In FIG. 13, based on detection of a PDCCH including downlink control information in a downlink subframe with the subframe number 3, the terminal apparatus 1 adjusts the PUSCH transmission corresponding to the PDCCH including the downlink control information to be in an uplink subframe with the subframe number 7. In FIG. 13, based on the detection of the PDCCH including downlink control information in the downlink subframe with the subframe number 3, the terminal apparatus 1 adjusts the first PUSCH transmission in a bundle corresponding to the PDCCH including the downlink control information to be in the uplink subframe with the subframe number 7. When the value k is given at least based on FIG. 12, the terminal apparatus 1 cannot adjust the corresponding PUSCH transmission to be in a special subframe.

When the special subframe configuration 10, the parameter pusch-UpPtsAdd, and the parameter pucch-UpPtsAdd are not configured for the terminal apparatus 1, the uplink subframe is usable for the PUSCH transmission for the downlink control information (uplink grant) transmitted on the PDCCH, and the special subframe is not usable for the PUSCH transmission.

When the parameter pusch-UpPtsAdd or the parameter pucch-UpPtsAdd is configured for the terminal apparatus 1, the value k may be obtained at least based on FIG. 14. In FIG. 15, based on a detection of a PDCCH including downlink control information in the special subframe with the subframe number 1, the terminal apparatus 1 adjusts the PUSCH transmission corresponding to the PDCCH including the downlink control information to be in the special subframe with the subframe number 6. In FIG. 15, based on the detection of a PDCCH including downlink control information in the special subframe with the subframe number 1, the terminal apparatus 1 adjusts the first PUSCH transmission in the bundle corresponding to the PDCCH including the downlink control information to be in the special subframe with the subframe number 6. When the value k is obtained at least based on FIG. 14, the terminal apparatus 1 can adjust the PUSCH transmission to be in the special subframe.

When the parameter pusch-UpPtsAdd or the parameter pucch-UpPtsAdd is configured for the terminal apparatus 1, or the special subframe configuration 10 is configured for the terminal apparatus 1, the special subframe including the uplink subframe and the added UpPTS is usable for the PUSCH transmission corresponding to the downlink control information (uplink grant) transmitted on the PDCCH. The special subframe including no added UpPTS cannot be used for the PUSCH transmission.

In other words, the terminal apparatus 1 may determine the value k at least based on a table that is selected from tables in FIG. 12 and FIG. 14, based on whether or not the parameter pusch-UpPtsAdd or the parameter pucch-UpPtsAdd is configured for the terminal apparatus 1 and whether or not the special subframe configuration 10 is configured for the terminal apparatus 1. The terminal apparatus 1 may monitor the PDCCH including the downlink control information (uplink grant) based on the selected table.

When the parameter pusch-UpPtsAdd or the parameter pucch-UpPtsAdd is configured for the terminal apparatus 1, the bundle may correspond to the special subframe. When the parameter pusch-UpPtsAdd or the parameter pucch-UpPtsAdd is not configured for the terminal apparatus 1, the bundle corresponds to the uplink subframe only. In other words, whether or not the bundle corresponds to the special subframe can be given based on the parameter pusch-UpPtsAdd and/or parameter pucch-UpPtsAdd. In other words, the number of special subframes corresponding to the bundle may be given based on the parameter pusch-UpPtsAdd and/or parameter pucch-UpPtsAdd.

When the special subframe configuration 10 is configured for the terminal apparatus 1, the bundle may correspond to the special subframe. When a special subframe configuration other than that with the number 10 is configured for the terminal apparatus 1, the bundle may correspond to the uplink subframe only. In other words, whether the bundle corresponds to the special subframe may be given based on the special subframe configuration. In other words, the number of special subframes corresponding to the bundle can be given based on the special subframe configuration.

The DCI format 0 at least includes (a) 'Resource block assignment and hopping resource allocation' field, (b) 'Modulation and coding scheme and redundancy version' field, and (c) 'New data indicator' field.

The terminal apparatus 1 performs initial transmission or retransmission of a PUSCH based on (c)NDI (new data indicator) in the DCI format 0 with the CRC parity bit scrambled by C-RNTI, for each HARQ process. Based on a fact that the NDI is toggled, the terminal apparatus 1 performs initial transmission of the PUSCH/bundle (transport block). Based on a fact that the NDI is not toggled, the terminal apparatus 1 performs retransmission of the PUSCH/bundle (transport block).

The terminal apparatus 1 stores the NDI value received in each HARQ process. If the NDI is toggled, it means that the NDI value stored is different from the NDI value received. If the NDI is not toggled, it means that the NDI value stored is the same as the NDI value received.

Figure 16:
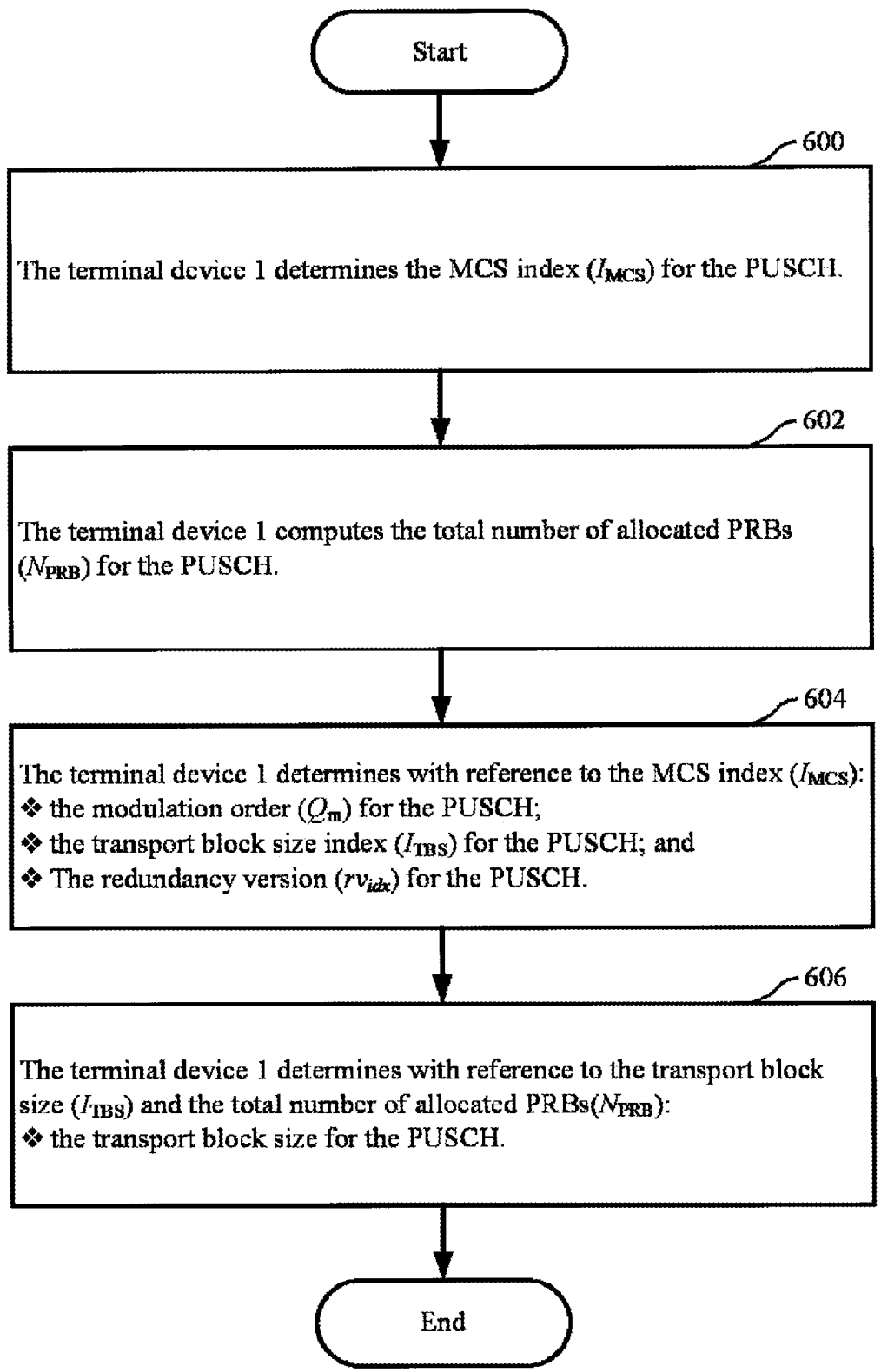
FIG. 16 is a diagram illustrating an example of how to acquire scheduling information with respect to a PUSCH according to the present embodiment.

FIG. 16 is a diagram illustrating an example of how to acquire scheduling information with respect to a PUSCH according to the present embodiment. The scheduling information includes the total number of physical resource blocks allocated ($N_{PRB}$), a modulation order ($Q_m$), a redundant version ($rv_{idx}$), and a transport block size. The redundant version ($rv_{idx}$) is used for coding (rate matching) of a transport block transmitted on the PUSCH. The transport block size indicates the number of bits of a transport block. In the terminal apparatus 1, the scheduling information may be acquired by a scheduling information interpretation unit 1013. In the base station apparatus 3, the scheduling information may be acquired/determined by a scheduling unit 3013.

The terminal apparatus 1 performs processing FIG. 16 for each serving cell and for each bundle.

(1600) The terminal apparatus 1 determines an MCS index ($I_{MCS}$) for a PUSCH/bundle, at least based on the (b)'Modulation and coding scheme and redundancy version' field.

(1602) The terminal apparatus 1 calculates the total number ($N_{PRB}$) of physical resource blocks assigned to the PUSCH/bundle at least based on the (a)'Resource block assignment and hopping resource allocation' field.

(1604) The terminal apparatus 1 determines a modulation order ($Q_m$) for the PUSCH, a transport block size index ($I_{TBS}$) for the PUSCH, and a redundant version ($rv_{idx}$) for the PUSCH/bundle, by at least referring to the MCS index ($I_{MCS}$) for the PUSCH determined in 1600.

(1606) The terminal apparatus 1 determines a transport block size (TBS) for the PUSCH/bundle, by at least referring to the total number (NPRB) of physical resource blocks assigned to the PUSCH calculated in 1602 and the MCS index ($I_{MCS}$) for the PUSCH determined in 1604.

FIG. 17 is a diagram illustrating a table associating the MCS index ($I_{MCS}$), ($Q'_m$), transport block size index ($I_{TBS}$), and redundant version ($rv_{idx}$) to each other according to the present embodiment. Here, $Q'_m$ is used for determining the modulation order ($Q_m$). For example, the modulation order ($Q_m$) may be $Q'_m$.

In FIG. 17, if the value MCS index ($I_{MCS}$) is 0, ($Q'_m$) is 8, the transport block size index ($I_{TBS}$) is 33, and the redundant version ($rv_{idx}$) is 0. In FIG. 17, if the value MCS index ($I_{MCS}$) is 29, 30, or 31, ($Q'_m$) and the transport block size index ($I_{TBS}$) are reserved. The MCS indices ($I_{MCS}$) 29, 30, and 31 are used for PUSCH retransmission.

FIG. 18 is a diagram illustrating association among the P, the transport block size index ($I_{TBS}$), and the transport block size according to the present embodiment. P is given at least based on the total number ($N_{PRB}$) physical resource blocks assigned. In FIG. 18, the transport block size is 16, if P is 1 and the transport block size index ($I_{TBS}$) for the PUSCH is 0.

The value P may be given based on any of Equation (3), Equation (4), and Equation (5) described below.

$$P=N_{PRB} \qquad \text{Equation (3)}$$

$$P=\max[\text{floor}\{N_{PRB}\times\alpha\},1] \qquad \text{Equation (4)}$$

$$P=\max[\text{floor}\{N_{PRB}\times\beta\},1] \qquad \text{Equation (5)}$$

In the equations, floor is a floor function for outputting a largest integer small than the input value, max is a function for outputting the largest value from a plurality of input values; a is a decimal larger than 0 and smaller than 1, and $\beta$ is a decimal larger than 0 and smaller than 1. $\alpha$ and $\beta$ may be different decimals. The values $\alpha$ and $\beta$ may be the same. For example, $\alpha$ may be 0.5, and $\beta$ may be 0.75. For example, $\beta$ may be given based on the number of special subframes corresponding to the bundle. In other words, 13 may be given at least based on the special subframe configuration.

When the higher layer (RRC layer) parameter ttiBundling is not configured and the PUSCH transmission is performed in the uplink subframe, P for the PUSCH transmission may be given by Equation (3).

When the higher layer (RRC layer) parameter ttiBundling is not configured, and the PUSCH transmission is performed in the special subframe, P for the PUSCH transmission may be given by Equation (4).

When the higher layer (RRC layer) parameter ttiBundling is configured and the bundle does not correspond to the special subframe, P for the bundle may be given by Equation (3).

When the higher layer (RRC layer) parameter ttiBundling is configured and the bundle corresponds to the special subframe, P for the bundle may be given by Equation (5)

When the higher layer (RRC layer) parameter ttiBundling is configured, P for the bundle may be given by Equation (5).

In other words, P may be given at least based on (i) whether the parameter ttiBundling is configured, (ii) the special subframe configuration, (iii) whether the bundle corresponds to a special subframe, and/or (iv) the number of special subframes corresponding to the bundle.

A redundant version $rv_{idx} \in \{0, 1, 2, 3\}$ according to the present embodiment will be described below.

The terminal apparatus 1 determines the redundant version ($rv_{idx}$) for transmission of each of the four PUSCHes included in the bundle, by at least referring to the MCS index ($I_{MCS}$) for the PUSCH determined in 1600. The redundant version is used for coding a transport block (codeword). The transport block is mapped to a codeword. The codeword is a unit of the coding.

The coding for a transport block (codeword) is described below.

Figure 19:
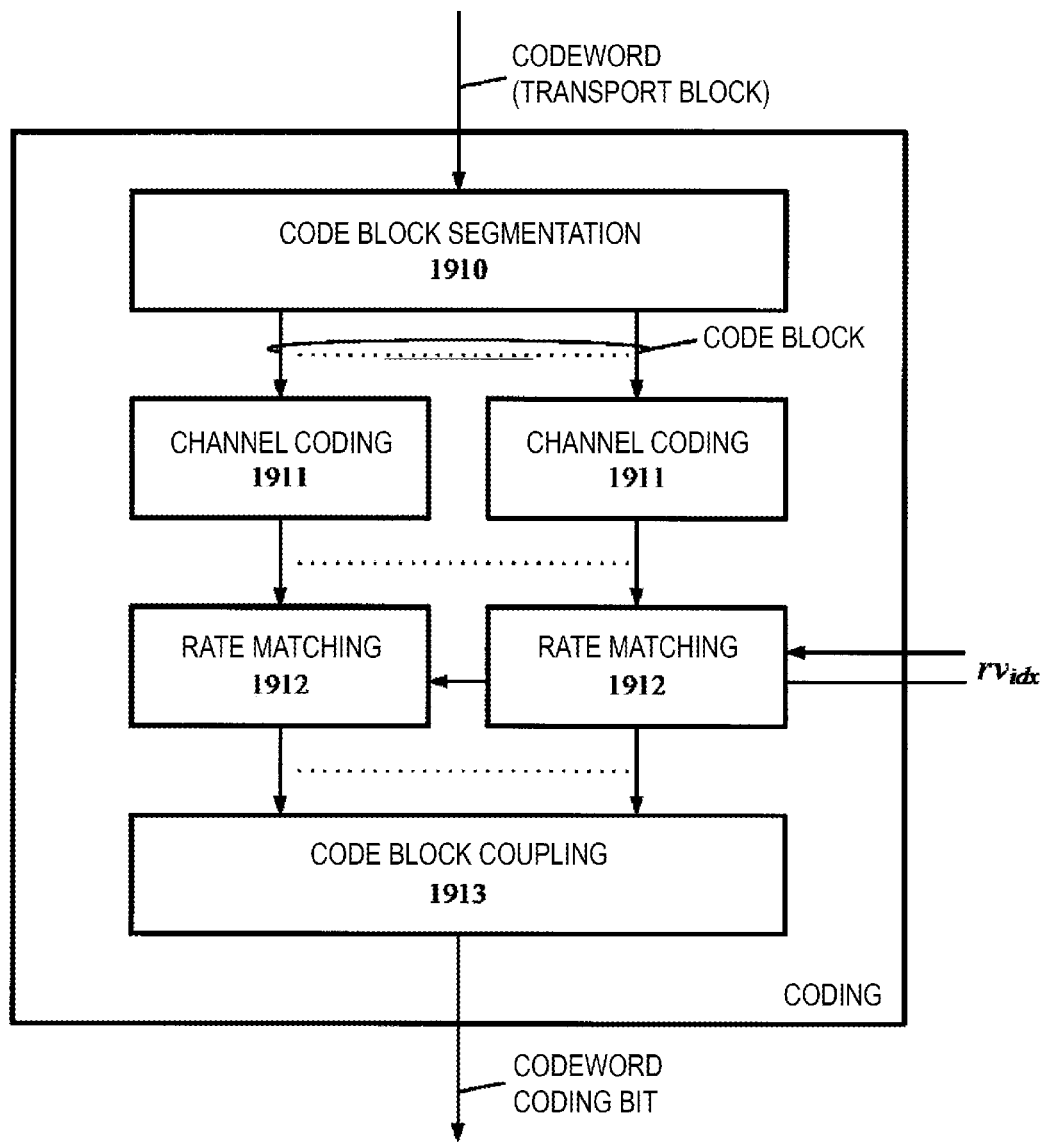
FIG. 19 is a diagram illustrating an example of coding processing for a codeword (transport block) according to the present embodiment.

FIG. 19 is a diagram illustrating an example of coding for a codeword (transport block) according to the present embodiment. The processing in FIG. 19 may be applied to each of transport blocks. The processing in FIG. 19 may be applied to each transmission in one bundle. One transport block is mapped to one codeword. In other words, coding a transport block is equivalent to coding a codeword.

(Step 1910) After adding a corresponding CRC parity bit to one code word, the code word is segmented into one or a plurality of code blocks. The corresponding CRC parity bit may be added to each of code blocks. (Step 1911) Each of one or a plurality of code blocks is coded (for example, turbo coding, convolution coding, or Low Density Parity Check (LDPC) coding).

(Step 1912) Rate matching is applied to each code bit sequence in the code block. The rate matching is performed in accordance with the redundant version $rv_{idx}$.

(Step 1913) The code bit sequence of the code word is obtained by connecting one or a plurality of code blocks to which the rate matching is applied.

Figure 20:
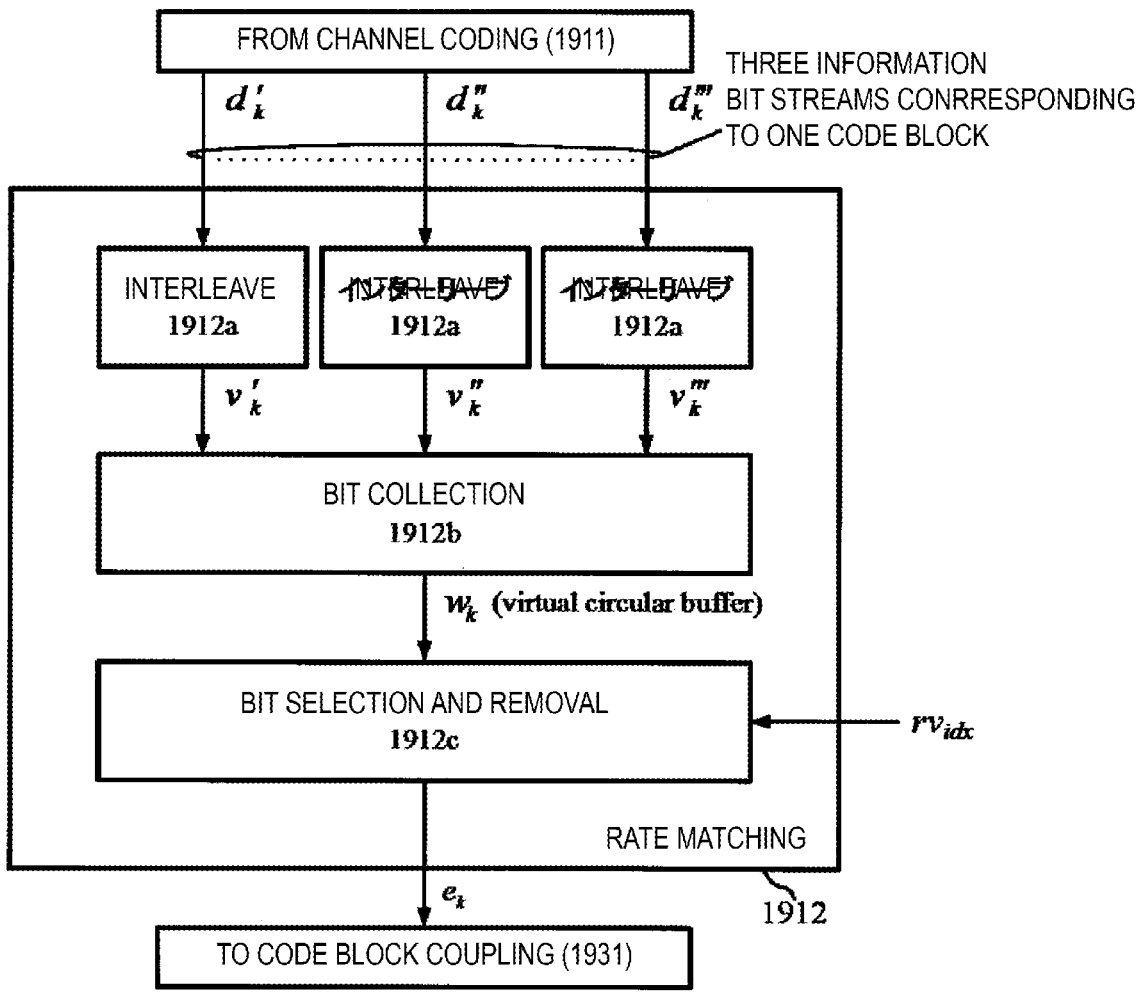
FIG. 20 is a diagram illustrating an example of rate matching according to the present embodiment.

FIG. 20 is a diagram illustrating an example of rate matching according to the present embodiment. The rate matching is performed in Step 1912 in FIG. 19. In other words, the rate matching is applied to the code block of the transport block.

One rate matching (Step 1912) includes interleaving performed for three times (Step 1912a), one bit collection (Step 1912b), one bit selection and pruning (Step 1912c). For one rate matching (Step 1912), three information bitstreams ($d'_k, d''_k, d'''_k$) are input from the channel coding (Step 1911). In Step 1912a, the three information bitstreams ($d'_k, d''_k, d'''_k$) are each interleaved in accordance with a subblock interleaver. By interleaving each of the three information bitstreams ($d'_k, d''_k, d'''_k$), three output sequences ($v'_k, v''_k, v'''_k$) are obtained.

The number of columns $C_{subblock}$ of the subblock interleaver is 32. The number of rows $R_{subblock}$ is the smallest integer satisfying Inequality (6) described below. In the inequity, D represents the number of bits of each information bitstream ($d'_k, d''_k, d'''_k$).

$$D \le (R_{subblock} \times C_{subblock}) \quad \text{Equation (6)}$$

The number of bits Ku of each of the output sequence ($v'_k, v''_k, v'''_k$) of the subblock interleaver is given by the following Equation (7).

$$K_\Pi = (R_{subblock} \times C_{subblock}) \quad \text{Equation (7)}$$

In Step 1912b, $w_k$ (virtual circular buffer) is obtained from the three output sequences ($v'_k, v''_k, v'''_k$). $w_k$ is given by the following Equation (8). The number of bits Kw of $w_k$ is three times as large as that of $K_\Pi$.

$$w_k = v'_k \text{ for } k=0, \ldots, K_\Pi - 1 \quad \text{Equation (8)}$$

$$w_{K_\Pi + 2k} = v''_k \text{ for } k=0, \ldots, K_\Pi - 1$$

$$w_{K_\Pi + 2k+1} = v'''_k \text{ for } k=0, \ldots, K_\Pi - 1$$

In Step 1912c (bit selection and pruning), a rate matching output sequence $e_k$ is obtained from $w_k$. E represents the number of bits of the rate matching output bit sequence $e_k$. FIG. 21 is a diagram illustrating an example of bit selection and removal according to the present embodiment. In FIG. 21, $rv_{idx}$ is the redundancy version (RV) number for transmission of the corresponding transport block. In FIG. 21, $N_{cb}$ is a software buffer size for the corresponding code block, and is expressed by the number of bits. $N_{cb}$ is given by the following Equation (9).

$$N_{cb} = \begin{cases} \min\left(\left\lfloor \frac{N_{IR}}{C} \right\rfloor, K_w\right) & \text{for } PDSCH \, (DL-SCH) \\ K_w & \text{for } PDSCH \, (UL-SCH) \end{cases} \quad \text{Equation (9)}$$

In the equation, C is the number of code blocks into which a single transport block is segmented in the code block segmentation (Step 1910) in FIG. 19. Here, $N_{IR}$ is a software buffer size for the corresponding transport block and is expressed by the number of bits. $N_{IR}$ is given by the following Equation (10).

$$N_{IR} = \left\lfloor \frac{N_{soft}}{K_C \cdot K_{MIMO} \cdot \min(M_{DL\_HARQ}, M_{limit})} \right\rfloor \quad \text{Equation (10)}$$

When the terminal apparatus 1 is configured to receive the PDSCH transmission based on the transmission mode 3, 4, 8, 9, or 10, the $K_{MIMO}$ is 2. The $K_{MIMO}$ is 1 in other cases. $K_{MIMO}$ is equal to the maximum number of transport blocks that can be included in one PDSCH transmission received based on the transmission mode configured for the terminal apparatus 1.

Here, $M_{DL\_HARQ}$ is the maximum number of downlink HARQ processes managed in parallel in one corresponding serving cell. For an FDD serving cell, $M_{DL\_HARQ}$ may be 8. For a TDD serving cell, $M_{DL\_HARQ}$ may correspond to the UL/DL configuration. Here, $M_{limit}$ is 8.

Here, $K_c$ is any of {1, 3/2, 2, 3, and 5}. Description on how $K_c$ is configured will be omitted.

Here, $N_{soft}$ is the total number of software channel bits corresponding to the UE category or downlink UE category. $N_{soft}$ is given by any of an ability parameter ue-Category (without suffix), an ability parameter ue-Category-v1020, an ability parameter ue-Category-v1170, and an ability parameter ue-CategoryDL-r12.

In other words, the redundant version $rv_{idx}$ is a parameter used for the rate matching and for the bit selection and pruning.

The redundant version $rv_{idx}$ for each PUSCH transmission in a bundle is described below.

When the retransmission of the bundle is designated by the uplink grant, the redundant version $rv_{idx}$ corresponding to the MCS index ($I_{MCS}$) is any of 0 to 3. For example, when the retransmission of the bundle is designated by the uplink grant, MCS index ($I_{MCS}$) in FIG. 17 is any of 0 to 31.

When the initial transmission of the bundle is designated by the uplink grant, the redundant version $rv_{idx}$ corresponding to the MCS index ($I_{MCS}$) is 0. For example, when the initial transmission of the bundle is designated, MCS index ($I_{MCS}$) in FIG. 17 is any of 0 to 28. Here, the initial transmission of a bundle includes one PUSCH transmission and three PUSCH non-adaptive retransmissions.

The redundant version $rv_{idx}$ for the first PUSCH transmission in the bundle may be given at least based on the MCS index ($I_{MCS}$) for the PUSCH determined in 1600 and the type of the subframe corresponding to the first PUSCH transmission in the bundle.

(A1) When the subframe corresponding to the first PUSCH transmission in the bundle is an uplink subframe and the redundant version corresponding to the MCS index ($I_{MCS}$) is 0, the redundant version $rv_{idx}$ for the first PUSCH transmission in the bundle may be 0.

(A2) When the subframe corresponding to the first PUSCH transmission in the bundle is a special subframe and the redundant version corresponding to the MCS index ($I_{MCS}$) is 0, the redundant version $rv_{idx}$ for the first PUSCH transmission in the bundle may be a value other than 0 (1, for example).

(A3) When the redundant version corresponding to the MCS index ($I_{MCS}$) is a value other than 0, the redundant version $rv_{idx}$ for the first PUSCH transmission in the bundle may be a value of the redundant version corresponding to the MCS index ($I_{MCS}$) regardless of the type of the subframe corresponding to the first PUSCH transmission in the bundle.

(B1) When the subframe corresponding to the first PUSCH transmission in the bundle is an uplink subframe and initial transmission of the bundle is performed, the redundant version $rv_{idx}$ for the first PUSCH transmission in the bundle may be 0. Here, the redundant version corresponding to the MCS index ($I_{MCS}$) is 0.

(B2) When the subframe corresponding to the first PUSCH transmission in the bundle is a special subframe and the initial transmission of the bundle is performed, the redundant version $rv_{idx}$ for the first PUSCH transmission in the bundle may be a value other than 0 (1 for example). Here, the redundant version corresponding to the MCS index ($I_{MCS}$) is 0.

(B3) When the bundle is retransmitted, the MCS index ($I_{MCS}$) may be a value of the corresponding redundant version regardless of the type of the subframe corresponding to the first PUSCH transmission in a bundle. Here, the redundant version corresponding to the MCS index ($I_{MCS}$) is any of 0 to 3.

The terminal apparatus 1 may perform the PUSCH non-adaptive retransmission, while incrementing the redundant version corresponding to the preceding PUSCH transmission in the bundle. The redundant version is incremented in the order of 0, 2, 3, and 1. The redundant version 0 comes after the redundant version 1.

Figure 22:
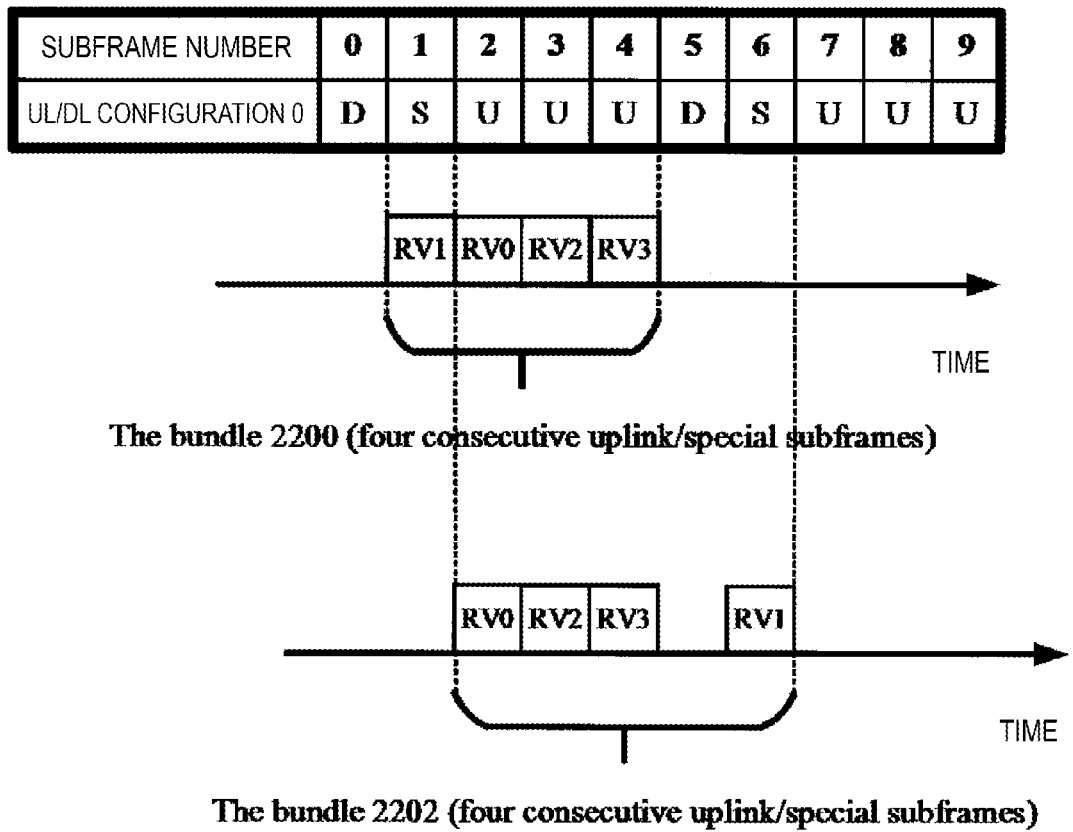
FIG. 22 is a diagram illustrating an example of correspondence between bundle and redundant version according to the present embodiment.
Figure 22:
Figure 22:
Figure 22:
Figure 22:

FIG. 22 is a diagram illustrating an example of correspondence between bundle and redundant version according to the present embodiment. In FIG. 22, the bundles 2200 and 2202 correspond to initial transmission. In FIG. 22, the MCS index ($I_{MCS}$) corresponding to the bundle 2200 is 0. In FIG. 22, the MCS index ($I_{MCS}$) corresponding to the bundle 2202 is 0.

In FIG. 22, the first PUSCH in the bundle 2200 is transmitted in a special subframe 1. In FIG. 22, the first PUSCH in the bundle 2202 is transmitted in an uplink subframe 2. The redundant version corresponding to the first PUSCH transmission in the bundle 2200 is 1, and the redundant version corresponding to the first PUSCH transmission in the bundle 2202 is 0. In other words, the redundant version corresponding to the first PUSCH transmission in a bundle is given based on a transmission start timing of the bundle. In other words, the redundant version corresponding to the first PUSCH transmission in a bundle is given based on the type of subframe for starting the transmission of the bundle.

Hereinafter, various aspects of the terminal apparatus 1 and the base station apparatus 3 according to the present embodiment will be described.

(1) A first aspect of the present embodiment provides a terminal apparatus that includes a scheduling information interpretation unit 1013 that acquires a size of a transport block transmitted in a bundle based on the number of special subframes corresponding to the bundle, and a transmission unit 107 that transmits the bundle including the transport block.

(2) A second aspect of the present embodiment provides a base station apparatus that includes a scheduling unit 3013 that acquires a size of a transport block transmitted by a terminal apparatus in a bundle at least based on the number of special subframes corresponding to the bundle, and a reception unit 305 that receives the bundle including the transport block.

(3) A third aspect of the present embodiment provides a terminal apparatus including a scheduling information interpretation unit 1013 that identifies a redundant version corresponding to the first transmission in a bundle at least based on a type of a subframe corresponding to the first PUSCH transmission in the bundle, and a transmission unit 107 that transmits the bundle.

(4) A fourth aspect of the present embodiment provides a base station apparatus that includes a scheduling unit 3013 that acquires a size of a transport block transmitted by a terminal apparatus in a bundle at least based on the number of special subframes corresponding to the bundle, and a reception unit 305 that receives the bundle including the transport block.

(5) In the first to the fourth aspects of the present embodiment, the transmission of the bundle includes four PUSCH transmissions corresponding to the same transport block.

(A1) One aspect of the present invention provides a terminal apparatus including: a reception unit that receives a PDCCH including downlink control information; and a transmission unit that transmits a PUSCH including a transport block, based on detection of the PDCCH. The transmission unit triggers non-adaptive retransmission without waiting for a feedback for preceding transmission in a bundle, when a parameter TTIbundling of an RRC layer is configured to be TRUE. A size of the transport block is given at least based on whether the parameter TTIbundling of the RRC layer is configured to be TRUE.

(A2) One aspect of the present invention provides a base station apparatus including: a transmission unit that transmits a PDCCH including downlink control information to a terminal apparatus; and a reception unit that receives a PUSCH including a transport block from the terminal apparatus, based on the transmission of the PDCCH. When a parameter TTIbundling of an RRC layer is configured to be TRUE for the terminal apparatus, the terminal apparatus triggers non-adaptive retransmission without waiting for a feedback for preceding transmission in a bundle. A size of the transport block is given at least based on whether the parameter TTIbundling of the RRC layer is configured to be TRUE for the terminal apparatus.

(A3) One aspect of the present invention provides a communication method used for a terminal apparatus, the communication method including the steps of: receiving a PDCCH including downlink control information; transmitting a PUSCH including a transport block, based on detection of the PDCCH; and triggering non-adaptive retransmission without waiting for a feedback for preceding transmission in a bundle, when a parameter TTIbundling of an RRC layer is configured to be TRUE. A size of the transport block is given at least based on whether the parameter TTIbundling of the RRC layer is configured to be TRUE.

(A4) One aspect of the present invention provides a communication method used for a base station apparatus, the communication method including the steps of: transmitting a PDCCH including downlink control information to a terminal apparatus; receiving a PUSCH including a transport block from the terminal apparatus, based on the transmission of the PDCCH; and when a parameter TTIbundling of an RRC layer is configured to be TRUE for the terminal apparatus, by the terminal apparatus, triggering non-adaptive retransmission without waiting for a feedback for preceding transmission in a bundle. A size of the transport block is given at least based on whether the parameter TTIbundling of the RRC layer is configured to be TRUE for the terminal apparatus.

(A5) According to one aspect of the present embodiment, the parameter TTIbundling of the RRC layer is not configured to be TRUE for the terminal apparatus, the size of the transport block is given at least based on which one of UpPTS of a special subframe and an uplink subframe is used for transmitting the transport block, and when the parameter TTIbundling of the RRC layer is configured to be TRUE for the terminal apparatus, the transport block is given regardless of which one of the uplink subframe and the UpPTS is used for transmitting the transport block.

Consequently, the terminal apparatus and the base station apparatus can efficiently communicate with each other by using an uplink signal.

Each of a program running on the base station apparatus 3 and the terminal apparatus 1 according to one aspect of the present invention may be a program (program for functioning a computer) that controls a Central Processing Unit (CPU) and the like, such that the program causes a computer to operate in such a manner as to realize the functions of the above-described embodiment according to one aspect of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (an apparatus group) constituted of multiple apparatuses. Each of the apparatuses configuring such an apparatus group may include some or all portions of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus is described as one example of a communication apparatus, but the present invention is not limited to this, and can be applied to a fixed-type or a stationary-type electronic apparatus installed indoors or outdoors, for example, a terminal apparatus or a communication apparatus, such as an audio-video (AV) apparatus, a kitchen apparatus, a cleaning or washing machine, an air-conditioning apparatus, office equipment, a vending machine, an automobile, a bicycle, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, one aspect of the present invention may be modified in various ways within the scope of the present invention defined by the claims, and embodiments that are made by suitably combining technical means disclosed according to different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

One aspect of the present invention is applicable to, for example, a communication system, a communication apparatus (for example, a mobile phone apparatus, a base station apparatus, a wireless LAN device, or a sensor device), an integrated circuit (for example, communication chip), a program, or the like.

REFERENCE SIGNS LIST 1 (1A, 1B, 1C) Terminal apparatus
3 Base station apparatus
101 Higher layer processing unit
103 Control unit
105 Reception unit
107 Transmission unit
301 Higher layer processing unit
303 Control unit
305 Reception unit
307 Transmission unit
1011 Radio resource control unit
1013 Scheduling information interpretation unit
1015 SPS control unit
3011 Radio resource control unit
3013 Scheduling unit
3015 SPS control unit

The invention claimed is:

1. A terminal apparatus comprising:
reception circuitry that receives a PDCCH including downlink control information; and
transmission circuitry that transmits a PUSCH including a transport block, based on detection of the PDCCH, wherein
the transmission circuitry triggers non-adaptive PUSCH retransmission without waiting for a feedback for transmission of the PUSCH in a bundle, when a parameter TTIbundling of an RRC layer is configured to be TRUE,
a size of the transport block is given at least based on whether the parameter TTIbundling of the RRC layer is configured to be TRUE,
when the parameter TTIbundling of the RRC layer is not configured to be TRUE, the size of the transport block is given based on a value of a transport block size index and a specific value, the specific value being at least based on which one of UpPTS of a special subframe and an uplink subframe is used for transmitting the transport block, and
when (a) the parameter TTIbundling of the RRC layer is not configured to be TRUE and (b) the transport block is transmitted in the UpPTS, the specific value is the largest integer value between a value given by a floor function and 1, where the floor function takes a value which is equal to a product of a total number of assigned physical resource blocks and a decimal larger than 0 and smaller than 1.

2. The terminal apparatus according to claim 1, wherein
when the parameter TTIbundling of the RRC layer is configured to be TRUE, the size of the transport block is given regardless of which one of the uplink subframe and the UpPTS is used for transmitting the transport block.

3. A base station apparatus comprising:
transmission circuitry that transmits a PDCCH including downlink control information to a terminal apparatus; and
reception circuitry that receives a PUSCH including a transport block from the terminal apparatus, based on the transmission of the PDCCH, wherein
when a parameter TTIbundling of an RRC layer is configured to be TRUE for the terminal apparatus, the reception circuitry receives non-adaptive PUSCH retransmission which is triggered by the terminal apparatus without waiting for a feedback for transmission of the PUSCH in a bundle, and
a size of the transport block is given at least based on whether the parameter TTIbundling of the RRC layer is configured to be TRUE for the terminal apparatus,
when the parameter TTIbundling of the RRC layer is not configured to be TRUE for the terminal apparatus, the size of the transport block is given based on a value of a transport block size index and a specific value, the specific value being at least based on which one of UpPTS of a special subframe and an uplink subframe is used for receiving the transport block, and
when (a) the parameter TTIbundling of the RRC layer is not configured to be TRUE for the terminal apparatus and (b) the transport block is received in the UpPTS, the specific value is the largest integer value between a value given by a floor function and 1, where the floor resource blocks and a decimal larger than 0 and smaller than 1.

4. The base station apparatus according to claim 3, wherein
when the parameter TTIbundling of the RRC layer is configured to be TRUE for the terminal apparatus, the size of the transport block is given regardless of which one of the uplink subframe and the UpPTS is used for receiving the transport block.

5. A communication method used for a terminal apparatus, the communication method comprising the steps of:
receiving a PDCCH including downlink control information;
transmitting a PUSCH including a transport block, based on detection of the PDCCH; and
triggering non-adaptive PUSCH retransmission without waiting for a feedback for transmission of the PUSCH in a bundle, when a parameter TTIbundling of an RRC layer is configured to be TRUE, wherein a size of the transport block is given at least based on whether the parameter TTIbundling of the RRC layer is configured to be TRUE,
when the parameter TTIbundling of the RRC layer is not configured to be TRUE, the size of the transport block is given based on a value of a transport block size index and a specific value, the specific value being at least based on which one of UpPTS of a special subframe and an uplink subframe is used for transmitting the transport block, and
when (a) the parameter TTIbundling of the RRC layer is not configured to be TRUE and (b) the transport block is transmitted in the UpPTS, the specific value is the largest integer value between a value given by a floor function and 1, where the floor function takes a value which is equal to a product of a total number of assigned physical resource blocks and a decimal larger than 0 and smaller than 1.

6. The communication method according to claim 5, wherein
when the parameter TTIbundling of the RRC layer is configured to be TRUE, the size of the transport block is given regardless of which one of the uplink subframe and the UpPTS is used for transmitting the transport block.

7. A communication method used for a base station apparatus, the communication method comprising the steps of:
transmitting a PDCCH including downlink control information to a terminal apparatus;
receiving a PUSCH including a transport block from the terminal apparatus, based on the transmission of the PDCCH; and when a parameter TTIbundling of an RRC layer is configured to be TRUE for the terminal apparatus, receiving non-adaptive PUSCH retransmission which is triggered by the terminal apparatus without waiting for a feedback for transmission of the PUSCH in a bundle, wherein a size of the transport block is given at least based on whether the parameter TTIbundling of the RRC layer is configured to be TRUE for the terminal apparatus, when the parameter TTIbundling of the RRC layer is not configured to be TRUE for the terminal apparatus, the size of the transport block is given based on a value of a transport block size index and a specific value, the specific value being at least based on which one of UpPTS of a special subframe and an uplink subframe is used for receiving the transport block, and when (a) the parameter TTIbundling of the RRC layer is not configured to be TRUE for the terminal apparatus, and (b) the transport block is received in the UpPTS, the specific value is the largest integer value between a value given b a floor function and 1, where the floor function takes a value which is equal to a product of a total number of assigned physical resource blocks and a decimal larger than 0 and smaller than 1.

8. The communication method according to claim 7, wherein when the parameter TTIbundling of the RRC layer is configured to be TRUE for the terminal apparatus, the size of the transport block is given regardless of which one of the uplink subframe and the UpPTS is used for receiving the transport block.

* * * * *